(12) United States Patent
Ballarin et al.

(10) Patent No.: US 10,338,620 B2
(45) Date of Patent: Jul. 2, 2019

(54) FEEDBACK CIRCUIT FOR REGULATION LOOPS

(71) Applicant: Infineon Technologies AG, Neubiberg (DE)

(72) Inventors: Fabio Ballarin, Padua (IT); Cristian Garbossa, Bressanone (IT); Marco Piselli, Padua (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/814,225

(22) Filed: Nov. 15, 2017

(65) Prior Publication Data
US 2019/0146532 A1 May 16, 2019

(51) Int. Cl.
*G05F 1/575* (2006.01)
*G05F 1/46* (2006.01)
*H05B 33/08* (2006.01)
*H02M 1/00* (2006.01)

(52) U.S. Cl.
CPC ............. *G05F 1/575* (2013.01); *G05F 1/461* (2013.01); *G05F 1/462* (2013.01); *H05B 33/0812* (2013.01); *H05B 33/0815* (2013.01); *H05B 33/0848* (2013.01); *H05B 33/0872* (2013.01); *H05B 33/0884* (2013.01); *H02M 2001/0025* (2013.01)

(58) Field of Classification Search
CPC ..... G05F 1/462; G05F 1/575; H05B 33/0812; H05B 33/0815; H05B 33/0842; H05B 33/0848; H05B 33/0872; H05B 33/0884
See application file for complete search history.

(56) References Cited

U.S. PATENT DOCUMENTS

| | | |
|---|---|---|
| 4,591,734 A | 5/1986 | Laughton |
| 6,529,354 B1 | 3/2003 | Shteynberg et al. |
| 7,573,252 B1 | 8/2009 | Griesert |
| | (Continued) | |

FOREIGN PATENT DOCUMENTS

| | | |
|---|---|---|
| CN | 102751858 A | 10/2012 |
| CN | 204168131 U | 2/2015 |
| WO | 2013117049 A1 | 8/2013 |

OTHER PUBLICATIONS

Xinquan, et al., "A Novel Digital Soft-Start Circuit for DC-DC Switching Regulator," Oct. 24, 2005, pp. 564-567.

*Primary Examiner* — Fred E Finch, III
*Assistant Examiner* — Ishrat F Jamali
(74) *Attorney, Agent, or Firm* — Shumaker & Sieffert, P.A.

(57) ABSTRACT

In some examples, a device includes an amplifier circuit configured to receive a reference voltage signal at a first input, receive a feedback signal at a second input, and generate an output signal based on the reference voltage signal and the feedback signal. In some examples, the device also includes a feedback circuit including a soft-shaper circuit that is electrically connected to the second input of the amplifier circuit. In some examples, the feedback circuit is configured to sense a voltage step in the reference voltage signal, generate a voltage step across the soft-shaper circuit approximately equal to the voltage step in the reference voltage signal in response to sensing the voltage step in the reference voltage signal, and ramp a voltage level across the soft-shaper circuit to zero after generating the voltage step across the soft-shaper circuit.

20 Claims, 18 Drawing Sheets

(56) References Cited

U.S. PATENT DOCUMENTS

| | | |
|---|---|---|
| 7,692,939 B2 | 4/2010 | Bucheru |
| 7,830,129 B2 | 11/2010 | Tseng |
| 8,068,354 B2 * | 11/2011 | Wang ................ H02M 3/33507 |
| | | 323/276 |
| 8,390,263 B2 | 3/2013 | Chiang et al. |
| 8,693,216 B2 | 4/2014 | Moon et al. |
| 8,704,506 B2 | 4/2014 | Lipka et al. |
| 8,724,347 B2 | 5/2014 | Hosotani |
| 2014/0266122 A1 * | 9/2014 | Zhu ....................... H02M 3/156 |
| | | 323/284 |

* cited by examiner

FEEDBACK CIRCUIT FOR REGULATION LOOPS

TECHNICAL FIELD

This disclosure relates to current or voltage regulation circuits and, more particularly, to current or voltage regulation circuits with feedback loops.

BACKGROUND

A current regulator or a voltage regulator is a device that produces a steady output current or voltage for use by other components in an electrical circuit. A regulator may behave like a variable resistance, where the resistance of the regulator varies with the load impedance. There are different types of regulators, such as linear regulators and switching regulators. A linear regulator may include an amplifier that controls a pass device, which may include a transistor. The amplifier in a linear regulator may compare the output current or voltage of the regulator with a reference current or voltage and adjust the pass device to maintain a constant output current or voltage.

SUMMARY

This disclosure describes techniques for generating a feedback signal for an amplifier circuit. A feedback circuit may be configured to generate the feedback signal by at least generating a voltage step across a soft-shaper circuit that is approximately equal to a voltage step in a reference voltage signal received by the amplifier circuit. The feedback circuit may then be configured to ramp the voltage level across the soft-shaper circuit to a voltage level of an output signal generated by the amplifier circuit.

In some examples, a device includes an amplifier circuit including a first input and a second input. The amplifier circuit is configured to receive a reference voltage signal at the first input of the amplifier circuit, receive a feedback signal at the second input of the amplifier circuit, and generate an output signal based on the reference voltage signal and the feedback signal. In some examples, the device also includes a feedback circuit including a soft-shaper circuit that is electrically connected to the second input of the amplifier circuit. In some examples, the feedback circuit is configured to sense a voltage step in the reference voltage signal, generate a voltage step across the soft-shaper circuit approximately equal to the voltage step in the reference voltage signal in response to sensing the voltage step in the reference voltage signal, and ramp a voltage level across the soft-shaper circuit to zero after generating the voltage step across the soft-shaper circuit.

In some examples, a method includes sensing a voltage step in a reference voltage signal received at a first input of an amplifier circuit. The method also includes generating a voltage step across a soft-shaper circuit approximately equal to the voltage step in the reference voltage signal in response to sensing the voltage step in the reference voltage signal. The method further includes delivering a feedback signal from the soft-shaper circuit to the amplifier circuit, wherein the feedback signal includes the voltage step across the soft-shaper circuit. The method includes ramping, after generating the voltage step across the soft-shaper circuit, a voltage level across the soft-shaper circuit to zero.

In some examples, a voltage regulator circuit is configured to deliver a regulated signal to a light emitting diode (LED) based on an output voltage signal, and the voltage regulator circuit includes an amplifier circuit including a first input node and a second input node. The amplifier circuit is configured to receive a reference voltage signal at the first input node, receive a feedback signal at the second input node, and generate the output voltage signal based on the reference voltage signal and the feedback signal. The voltage regulator circuitry also includes a feedback circuit including a sense circuit configured to sense a voltage step in the reference voltage signal. The feedback circuit also includes a control circuit configured to cause the feedback circuit to generate a voltage step in the feedback signal approximately equal to the voltage step in the reference voltage signal in response to sensing the voltage step in the reference voltage signal. The control circuit is further configured to cause the feedback circuit to ramp a voltage level of the feedback signal to zero after generating the voltage step in the feedback signal and control whether the LED is active based on the output voltage signal.

The details of one or more examples are set forth in the accompanying drawings and the description below. Other features, objects, and advantages will be apparent from the description and drawings, and from the claims.

DETAILED DESCRIPTION

This disclosure describes a device and a method for regulation circuits that experience voltage steps. A feedback circuit of a regulation device may be configured to sense a voltage step in a reference voltage signal received at a first input of the amplifier circuit. The feedback circuit may include a soft-shaper circuit that is configured to deliver a voltage step to the amplifier circuit that is approximately equal to the voltage step in the reference voltage signal.

The amplifier circuit may include a differential amplifier such as an operational amplifier that amplifies the difference between the signals at two or more inputs. Due to the soft-shaper circuit, an amplifier circuit of this disclosure may generate an output signal with a smoother waveform, as compared to an amplifier circuit without a soft-shaper circuit. The voltage step generated by the feedback circuit may match, balance out, or offset the voltage step in the reference voltage signal, thereby reducing a change in the output signal caused by the voltage step in the reference voltage signal. The feedback circuit may then be configured to ramp the voltage level across the soft-shaper circuit to zero in order to ramp the output signal to a steady state level.

A device of this disclosure may adjust to changes in a reference voltage signal with fewer overshoots in the output signal, as compared to an amplifier circuit without a soft-shaper circuit. The soft-shaper circuit may cause smoother start-up sequences and shut-down sequences of the device, as compared to amplifier circuit without a soft-shaper circuit. The soft-shaper circuit may also include a small number of relatively simple components, as compared to other circuits for managing overshoots and reducing in-rush electrical currents.

Figure 1:
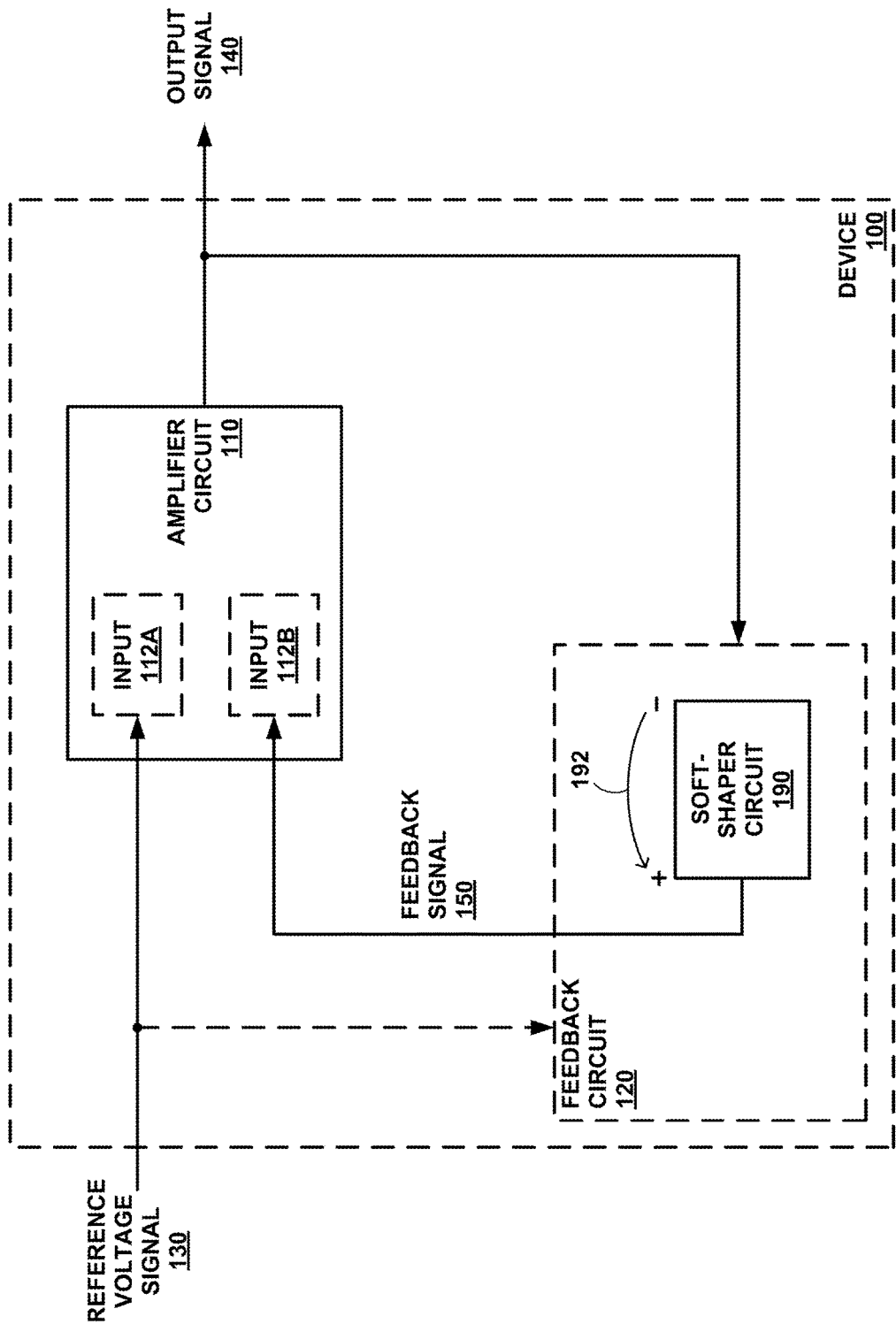
FIG. 1 is a conceptual block diagram illustrating a feedback circuit configured to deliver a feedback signal to an amplifier circuit, in accordance with some examples of this disclosure.

FIG. 1 is a conceptual block diagram illustrating a feedback circuit 120 configured to deliver a feedback signal 150 to an amplifier circuit 110, in accordance with some examples of this disclosure. Device 100 includes amplifier circuit 110, feedback circuit 120, and soft-shaper circuit 190. Device 100 may include a voltage regulator circuit and/or a current regulator circuit. Device 100 may be configured to maintain a constant or nearly constant voltage or electrical current at output signal 150.

Amplifier circuit 110 may receive and amplify signals at inputs 112A and 112B. In some examples, amplifier circuit 110 may include a differential amplifier and/or an operational amplifier. Amplifier circuit 110 may be configured to generate output signal 140 based on the difference between the signals received at inputs 112A and 112B, e.g., reference voltage signal 130 and feedback signal 150. Amplifier circuit 110 may include one or more transistors such as bipolar junction transistors (BJTs) and/or metal-oxide-semiconductor field-effect transistors (MOSFETs) configured to amplify the difference between the amplitudes of signals 130 and 150.

Amplifier circuit 110 may be configured to generate output voltage signal 140 by subtracting feedback signal 150 from reference voltage signal 130 to generate an error signal (not shown in FIG. 1). Amplifier circuit 110 may then be configured to amplify the error signal based on feedback circuit 120 and other characteristics of device 100. Feedback circuit 120 may be configured to generate a voltage step in voltage level 192 such that the difference between feedback signal 150 and reference voltage signal 130 is zero or nearly zero. Therefore, the error signal may remain at or near zero before and after the voltage steps in order to prevent in-rush electrical currents and fast changes in output voltage signal 140.

Feedback circuit 120 may be configured to receive reference voltage signal 130 and sense a voltage step in reference voltage signal 130. Feedback circuit 120 may be configured to track reference voltage signal 130. Feedback circuit 120 may include a sensing circuit such as a current mirror, a resistive element, and/or any other current or voltage sensor for sensing an amplitude of reference voltage signal 130. Feedback circuit 120 may also be configured to generate a voltage step across soft-shaper circuit 190 that is approximately equal to a sensed voltage step in reference voltage signal 130. For example, feedback circuit 120 may be configured to generate a voltage step of approximately five volts in response to sensing a voltage step of five volts in reference voltage signal 130.

As used herein, two voltage steps are approximately equal if amplitudes of the voltage steps are within five percent, ten percent, or fifteen percent of equal (e.g., the smaller voltage step is at least ninety-five, ninety, or eighty-five percent of the larger voltage step). As an example, if feedback circuit 120 generates a voltage step of four-and-one-half volts across soft-shaper circuit 190 in response to sensing a voltage step of five volts in reference voltage signal 130, the two voltage steps may be considered approximately equal for purposes of this disclosure if the definition of approximately equal includes voltage steps that are within ten percent or fifteen percent of exactly equal. The percentage difference may be measured as a percentage of the larger voltage step.

Reference voltage signal 130 may be a direct current (DC) voltage signal or an alternating current (AC) voltage signal, or a combination of DC and AC voltage signals, depending on the source of reference voltage signal 130. Amplifier circuit 110 may be configured to receive reference voltage signal 130 at input 112A.

Output voltage 140 may include an electrical current signal or a voltage signal generated by amplifier circuit 110. Amplifier circuit 110 may be configured to generate output signal 140 based on signals 130 and 150 received at inputs 112A and 112B. In some examples, amplifier circuit 110 may generate a signal to drive a pass element such as a transistor to generate output signal 140. For example, amplifier circuit 110 may generate and deliver a voltage signal to the control terminal (e.g., gate or base) of a pass element to control whether and how the pass element generates output signal 140. Device 100 may be configured to deliver output signal 140 to an electrical load. The electrical load may include an electronic device such as a computer or a smartphone, an electric motor, an electrical circuit, a light-producing device, a sound-producing device, and/or any other electrical load.

Feedback signal 150 may include a voltage signal that amplifier circuit 110 receives at input 112B. Soft-shaper circuit 190 may be configured to generate feedback signal 150 based on output signal 140. For example, soft-shaper circuit 190 may be configured to receive output signal 140 directly or through a voltage divider circuit. Feedback circuit 120 may be configured to generate a voltage drop across soft-shaper circuit 190 in order to increase or decrease the voltage amplitude of feedback signal 150 received at input 112B by amplifier circuit 110.

In accordance with the techniques of this disclosure, soft-shaper circuit 190 may be electrically connected to input 112B and configured to deliver feedback signal 150 to input 112B. Soft-shaper circuit 190 may be configured to generate a voltage step in response to a sensed voltage step of reference voltage signal 130. Soft-shaper circuit 190 may also be configured to ramp voltage level 192 across soft-shaper circuit 190 to zero after generating the voltage step across soft-shaper circuit 190. Feedback circuit 120 may also include a control circuit configured to cause the voltage step and the ramping of voltage level 192. In some examples, soft-shaper circuit 190 may include a current source and/or a resistor that are configured to cause the voltage step and the ramping of voltage level 192.

Device 100 may include simpler components and circuitry, as compared to other regulation devices. In some examples, device 100 may include embedded features for LED driving applications, such as soft-start, dimming, and fading. Device 100 may eliminate the need for an external soft-start circuit, an external soft-stop circuit, and/or an external soft-shaper circuit. Device 100 may achieve high performance in terms of reduction of output voltage overshoot/undershoot and in-rush currents without these external circuits.

Soft-shaper circuit 190 may be useful for voltage regulation loops and/or current regulation loops, for example, by means of a current source and a resistance. A control circuit may be configured to vary either the current source or the resistance value (or both) of soft-shaper circuit 190 in a pre-defined way in order to generate a time-varying voltage ramp with a controlled slope on voltage level 192. The current source of soft-shaper circuit 190 may be configured to generate a voltage ramp across a resistor of soft-shaper circuit 190. The current source may also be configured to apply an electrical current to an input (e.g., the inverting input) of amplifier circuit 110, to softly shape the changes in output voltage signal 140. In this way, as a consequence of variations in reference voltage signal 130 or start-up/shutdown events, amplifier circuit 110 may be configured to regulate output voltage signal 140, which may also be an electrical current signal, to a steady-state value with a pre-defined and smooth transition. In some examples, the overshoot at start-up for device 100 may decrease from two-and-one-half volts to ten millivolts because of the addition of soft-shaper circuit 190 and use of the techniques of this disclosure. A reduction in overshoots in output voltage signal 140 may result in less damage to an electrical load that receives output voltage signal 140.

Device 100 may also include embedded features for products like voltage regulators, LED drivers, and other applications. The embedded features may be relatively inexpensive, use simple components, take up relatively little space on an integrated circuit, and improve the performance of device 100.

Figure 2:
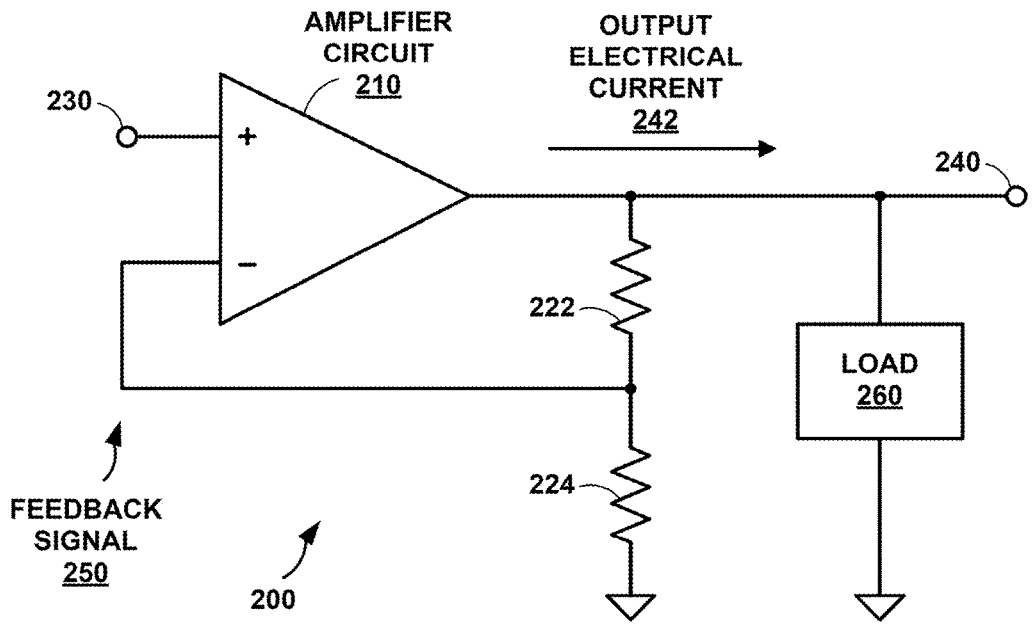
FIG. 2 is a circuit diagram illustrating a feedback circuit including an amplifier circuit configured to deliver an output voltage signal to a load.

FIG. 2 is a circuit diagram illustrating a feedback circuit including an amplifier circuit 210 configured to deliver an output voltage signal 240 to a load 260. Device 200 includes amplifier circuit 210, divider elements 222 and 224, and load 260. Amplifier circuit 210 may be configured to generate output voltage signal 240 and output electrical current 242 based on reference voltage signal 230 and feedback signal 250. Feedback signal 250 may include a voltage level that is based on output voltage signal 240 and based on the impedances of divider elements 222 and 224, which may be resistors and/or capacitors. Equation (1) defines output voltage signal 240 ($V_{out}$) as a function of reference voltage signal 230 ($V_{REF}$), the resistance of divider element 222 ($R_1$), and divider element 224 ($R_2$).

$$V_{out} = V_{REF} \frac{R1 + R2}{R2} \quad (1)$$

When reference voltage signal 230 changes faster than the loop reaction time, the inputs of amplifier circuit 210 can be temporarily unbalanced, causing large dynamic errors (i.e.: overshoots or undershoots) in output voltage signal 240 as well as large output in-rush currents in output electrical current 242. Avoiding those effects can improve the robustness of the application (e.g., voltage supply), and offer products with improved dynamic and optimized thermal performances.

In response to a voltage step in reference voltage signal 230, amplifier circuit 210 may generate a voltage step in output voltage signal 240. Feedback signal 250 may change (e.g., by an amplitude that is less than the voltage step in output voltage signal 240), causing amplifier circuit 210 to pull the amplitude of output voltage signal 240 in the other direction. Therefore, without a soft-shaper circuit, device 200 may generate overshoots in output voltage signal 240 and output electrical current 242.

Figure 3:
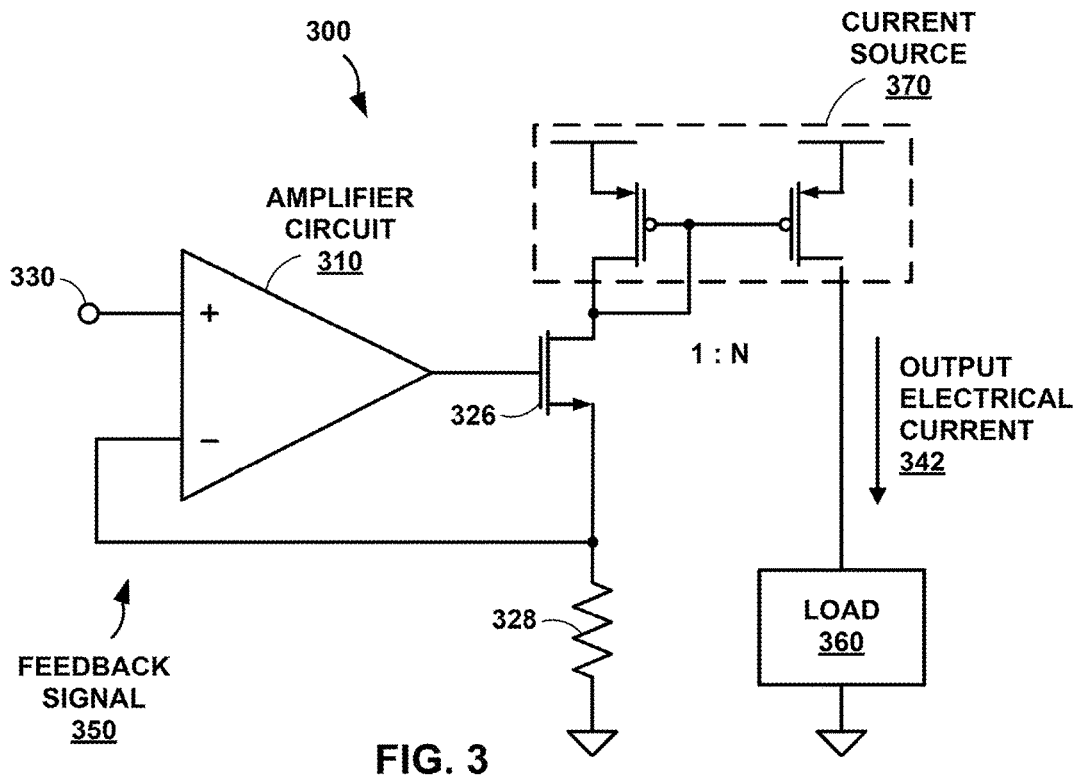
FIG. 3 is a circuit diagram illustrating a feedback circuit including an amplifier circuit and a current source configured to deliver an output electrical current to a load.

FIG. 3 is a circuit diagram illustrating a feedback circuit including an amplifier circuit 310 and a current source 370 configured to deliver an output electrical current 342 to a load 360. Device 300 includes amplifier circuit 310 configured to drive pass element 326 to cause current source 370 to deliver output electrical current 342 to electrical load 360. In response to a voltage step in reference voltage signal 330, amplifier circuit 310 may generate a voltage step in the output signal that drives pass element 326. Pass element 326 and current source 370 may conduct more or less electricity in response to the change in the output signal of amplifier circuit 310. Equation (2) defines output electrical current 342 ($I_{out}$) as a function of reference voltage signal 330 ($V_{REF}$), the resistance of divider element 328 (R3), and the ratio of current source 370 (N).

$$I_{out} = N \frac{V_{REF}}{R3} \quad (2)$$

Current source 370 may include a p-type MOS (PMOS) current mirror with a mirror ratio of one to N. When reference voltage signal 330 changes faster than the loop reaction time, the inputs of amplifier circuit 310 can be temporarily unbalanced, causing large dynamic errors (i.e.: overshoots or undershoots) in output electrical current 342. Avoiding those effects can improve robustness of the application (e.g., a light emitting diode (LED) driver) and improve the dynamic performance and the thermal performance.

The above-mentioned changes in reference voltage signal 330 may apply to both voltage regulation loops and current regulation loops. Reference voltage signal 330 may move quickly from zero volts to a steady-state operating value during start-up or from one operating value to a greater operating value (positive voltage step). Both events (i.e., startup and voltage change) can cause an overshoot of the output signal, such as output electrical current 342.

The soft-start, or soft-shaper, circuit of this disclosure may prevent or strongly reduce those unwanted effects of start-up or a positive input voltage step. If reference voltage signal 330 moves quickly from the steady-state operating value to zero volts (e.g., during shutdown) or from one operating value to a lower operating value (e.g., negative voltage step), this event can cause an undershoot of the output signal. The soft-stop, or soft-shaper, circuit of this disclosure may prevent or strongly reduce those unwanted effects of shut-down or a negative voltage step. The electrical behavior of a regulation loop when a start-up event occurs (e.g., reference voltage signal 330 increases from zero to one volts) may include an output overshoot and a high in-rush electrical current at the output node.

Figure 4:
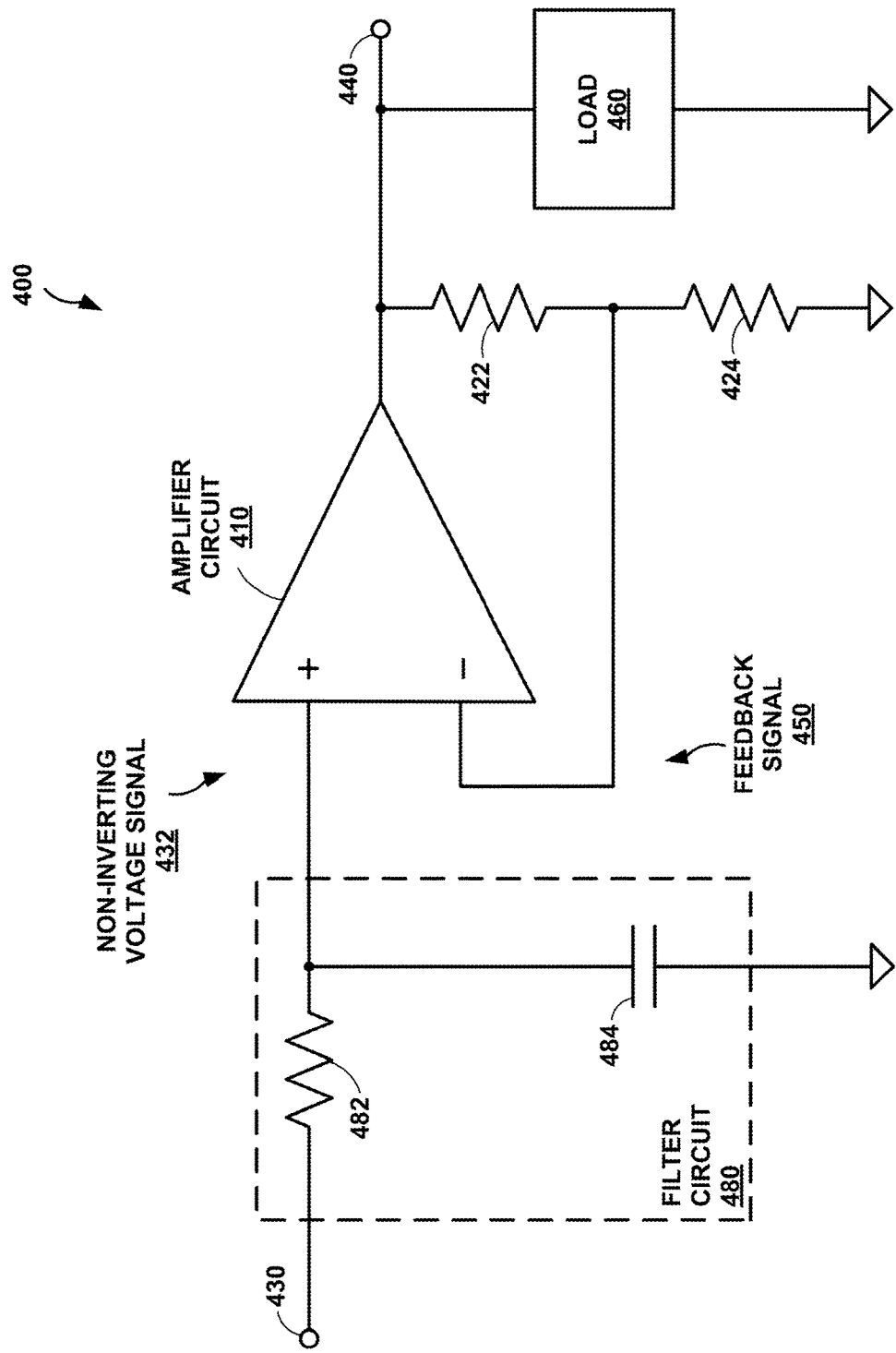
FIG. 4 is a circuit diagram illustrating a filter circuit and a feedback circuit including an amplifier circuit.

FIG. 4 is a circuit diagram illustrating a filter circuit 480 and a feedback circuit including an amplifier circuit 410. Device 400 may include filter circuit 480 configured to receive and filter out voltage steps in reference voltage signal 430. Filter circuit 480 may include resistor 482 and capacitor 484 configured to remove or attenuate high-frequency signals from reference voltage signal 430 and delivered a filtered signal as non-inverting voltage signal 432 to amplifier circuit 410. Filter circuit 480 may slow down the settling of the non-inverting input of amplifier circuit 410 ($V_{pos}$) and thus slow down the settling of output voltage signal 440 to its steady-state amplitude.

The slope of non-inverting voltage signal 432, and therefore the slope of output voltage signal 440, may not be linear over time. The slope of non-inverting voltage signal 432, and thus output voltage signal 440, depends on the amplitude of the voltage step in reference voltage signal 430. If reference voltage signal 430 can change in a set range of amplitudes (e.g., if reference voltage signal 430 is provided externally, as in a voltage tracker), the slope of output voltage signal 440 may spread too much. The approach of device 400 may load the input node of reference voltage signal 430 with some electrical current. Thus, the source of reference voltage signal 430 may need to include certain driving capabilities.

Figure 5A:
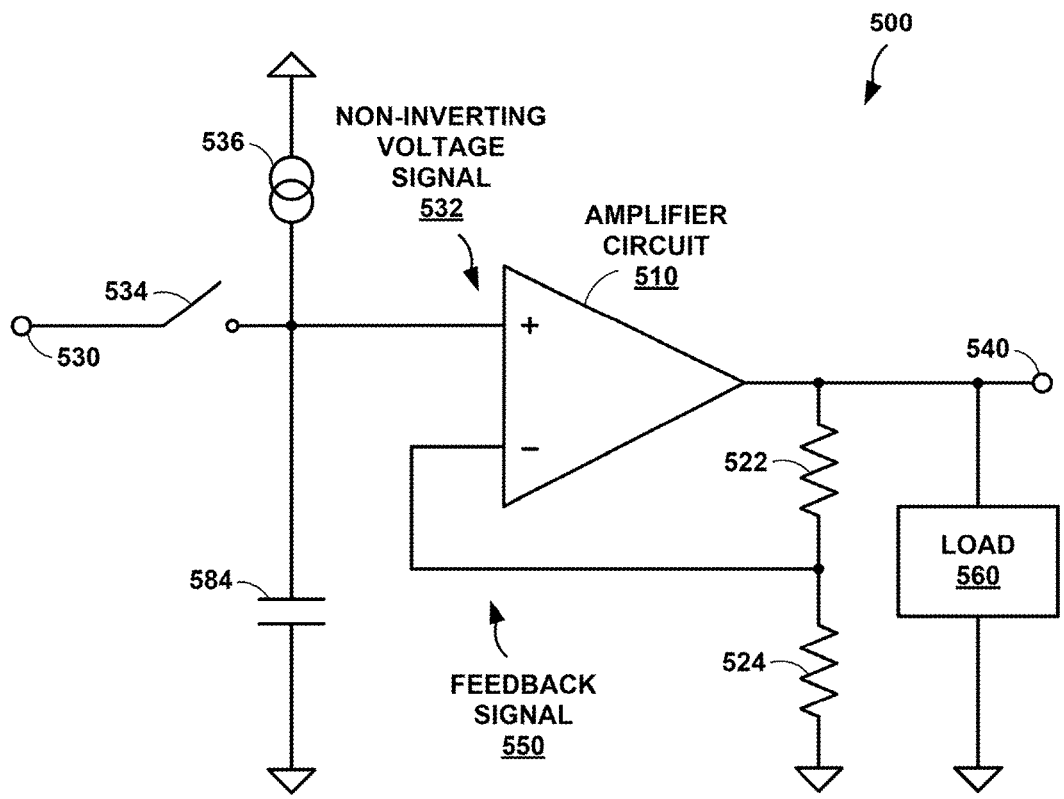
FIGS. 5A-5C illustrates a circuit diagram and two timing diagrams of the operation of a feedback circuit including an amplifier circuit with a current source connected to a source of a reference voltage signal.
Figure 5B:
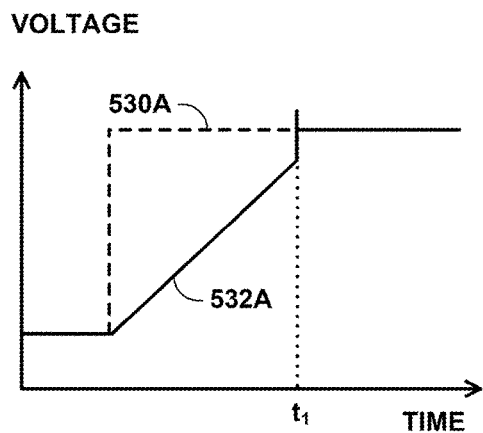
Figure 5C:
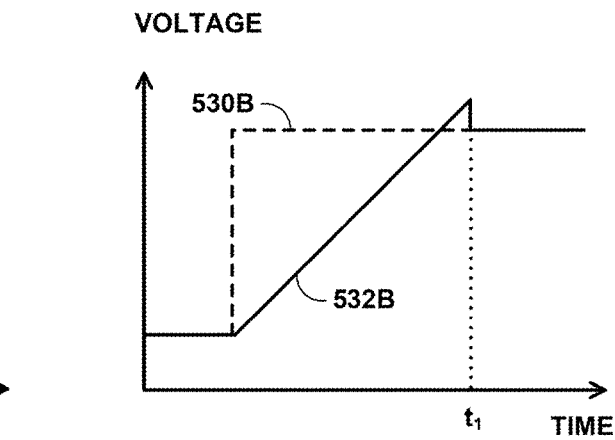

FIGS. 5A-5C illustrates a circuit diagram and two timing diagrams of the operation of a feedback circuit including an amplifier circuit 510 with a current source 536 connected to a source of a reference voltage signal 530. Device 500 may operate as a soft-start and soft-shaper only for positive voltage steps of reference voltage signal 530. When open, switch 534 may decouple reference voltage signal 530 and non-inverting voltage signal 532 before reference voltage signal 530 experiences a voltage step. With switch 534 open, the amplitude of reference voltage signal 530 is temporarily stored on capacitor 584, which is electrically connected to the non-inverting input of amplifier circuit 510. When reference voltage signal 530 has a positive voltage step, and constant current source 536 charges capacitor 584. When non-inverting voltage signal 532 reaches the final amplitude of reference voltage signal 530 after the applied voltage step, a control circuit may disable current source 536 and close switch 534 to reconnect the non-inverting input of amplifier circuit 510 to reference voltage signal 530.

The "constant-current capacitance charging" approach of device 500 may need an additional circuit, such as a comparator and a voltage reference to detect the "end of soft-start" or "end of soft-shaper" phase. Moreover, the non-idealities of device 500 may cause positive or negative jumps on non-inverting voltage signal 532, and thus on output voltage signal 540. When switch 534 is closed, non-inverting voltage signal 532 may ramp to a steady-state value, reducing the overall benefit of the soft-start and soft-shaper features. Device 500 may experience increased loads on the node of reference voltage signal 530 with some electrical current. The driver of reference voltage signal 530 may need to have certain sinking capabilities.

As shown in FIGS. 5B and 5C, the constant-current capacitance charging device may overshoot or undershoot at non-inverting voltage signal 532, and therefore at output voltage signal 540. Time $t_1$ corresponds to the end of the soft-shaper event detection. Non-inverting voltage signal 532A does not reach the amplitude of reference voltage signal 530A by time $t_1$, causing a sharp increase of non-inverting voltage signal 532A when switch 534 closes. The sharp increase of non-inverting voltage signal 532A may cause an overshoot of output voltage signal 540 and an electrical current to rush from the input of amplifier circuit 510 to load 560. Non-inverting voltage signal 532B overshoots the amplitude of reference voltage signal 530A before time $t_1$, causing an overshoot of output voltage signal 540.

Figure 6A:
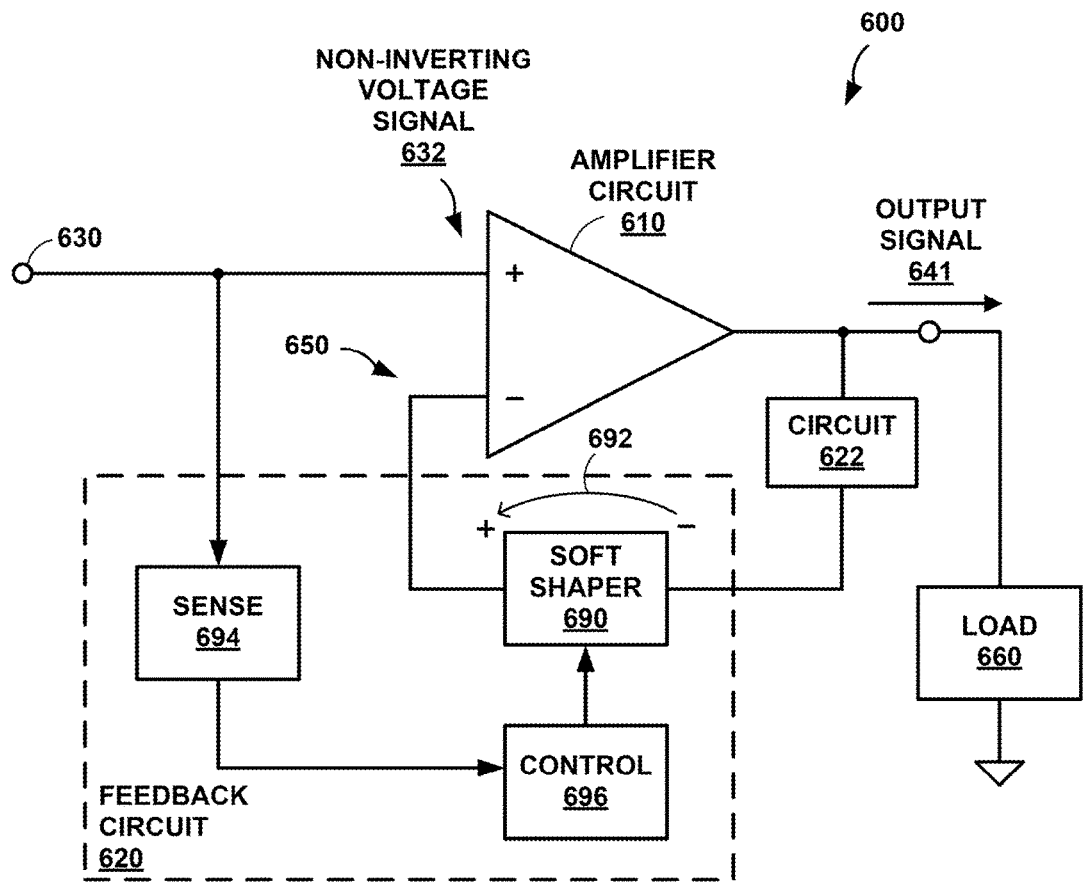
FIGS. 6A and 6B illustrate a circuit and timing diagram for a feedback circuit including a sense circuit, a control circuit, and a soft-shaper circuit, in accordance with some examples of this disclosure.
Figure 6B:
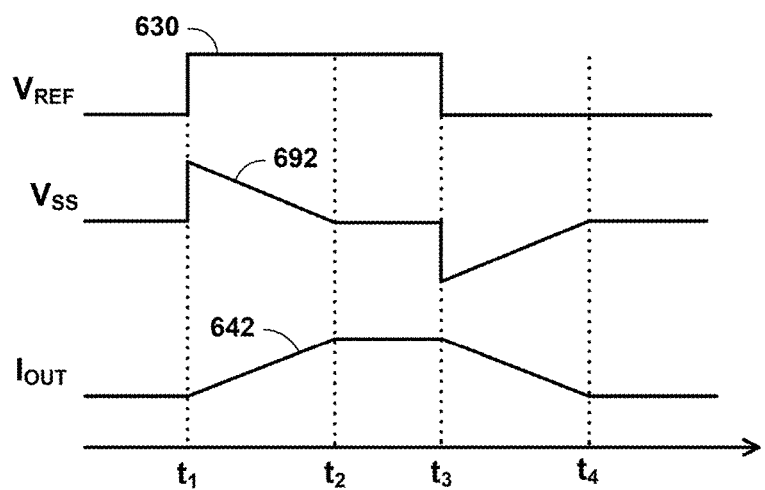

FIGS. 6A and 6B illustrate a circuit and timing diagram for a feedback circuit 620 including a sense circuit 694, a control circuit 696, and a soft-shaper circuit 690, in accordance with some examples of this disclosure. Soft-shaper circuit 690 may be configured to provide a softly changing signal (e.g., feedback signal 650) to an input (e.g., an inverting input) of amplifier circuit 610 in response to a fast change in the amplitude of reference voltage signal 630. The reference input signal may be a voltage signal and/or an electrical current signal, and the output signal of device 600 (e.g., output signal 641) may be a voltage signal and/or an electrical current signal.

When the regulation loop of device 600 is in steady state, soft-shaper circuit 690 may not be active such that the voltage level 692 ($V_{SS}$ in FIG. 6B) across soft-shaper circuit 690 is zero. Feedback signal 650 may equal the voltage level received by soft-shaper circuit 690 from circuit 622 when voltage level 692 is zero. During steady-state conditions, soft-shaper circuit 690 may operate as pass-through with no voltage drop between circuit 622 and the input node of amplifier circuit 610. Circuit 622 may include a divider circuit with two or more divider elements such as resistors or capacitors.

When a voltage step is applied to reference voltage signal 630 and non-inverting voltage signal 632 at time $t_1$ in FIG. 6B, sense circuit 694 of feedback circuit 620 may be configured to sense, detect, and/or measure the voltage step in reference voltage signal 630. Control circuit 696 of feedback circuit 620 may be configured to receive an indication of the amplitude of the voltage step in reference voltage signal 630. Control circuit 696 may be further configured to cause soft-shaper circuit 690 to generate a voltage step in voltage level 692 that is approximately equal to the voltage step in reference voltage signal 630 at time $t_1$. The polarity (e.g., positive or negative) of the voltage step in voltage level 692 may be the same as the polarity of reference voltage signal 630.

The difference in voltage levels at the two inputs of amplifier circuit 610 (e.g., signals 632 and 650) may be zero or nearly zero after the voltage steps in reference voltage signal 630 and voltage level 692. Control circuit 696 may then be configured to ramp voltage level 692 to zero after generating the voltage step. Voltage level 692 may finish ramping down at time $t_2$, and output electrical current 641 may reach a steady-state amplitude at approximately the time when voltage level 692 finishes ramping. When reference voltage signal 630 has a negative voltage step at time $t_3$, control circuit 696 may be configured to cause soft-shaper circuit 690 to generate an approximately equal voltage step in voltage level 692.

FIG. 6B depicts the ramping down of voltage level 692 between times $t_1$ and $t_2$ and ramping up of voltage level 692 between $t_3$ and $t_4$. The ramping phases in FIG. 6B may be referred to "soft-shaping phases." Voltage level 692 is depicted as time dependent, and the trend of voltage level 692 in time is shown qualitatively in FIG. 6B. FIG. 6B depicts a positive voltage step in reference voltage signal 630 at time $t_1$ and a negative voltage step in reference voltage signal 630 at time $t_3$. FIG. 6B also depicts the trend of voltage level 692 and output electrical current 641 over time. The time interval before time $t_1$, the time interval between times $t_2$ and $t_3$, and the time interval after $t_4$.

FIG. 6B depicts the ramping of voltage level 692 to zero as linear. However, in some examples, the ramping of voltage level 692 may be non-linear. The ramping of voltage level 692 to zero may cause the voltage level of feedback signal 650 to the voltage level of the output voltage signal, assuming that the voltage across circuit 622 is zero and output signal 641 is an output voltage signal. If output signal 641 is an electrical current signal, then circuit 622 may be a current-to-voltage converter.

Figure 7A:
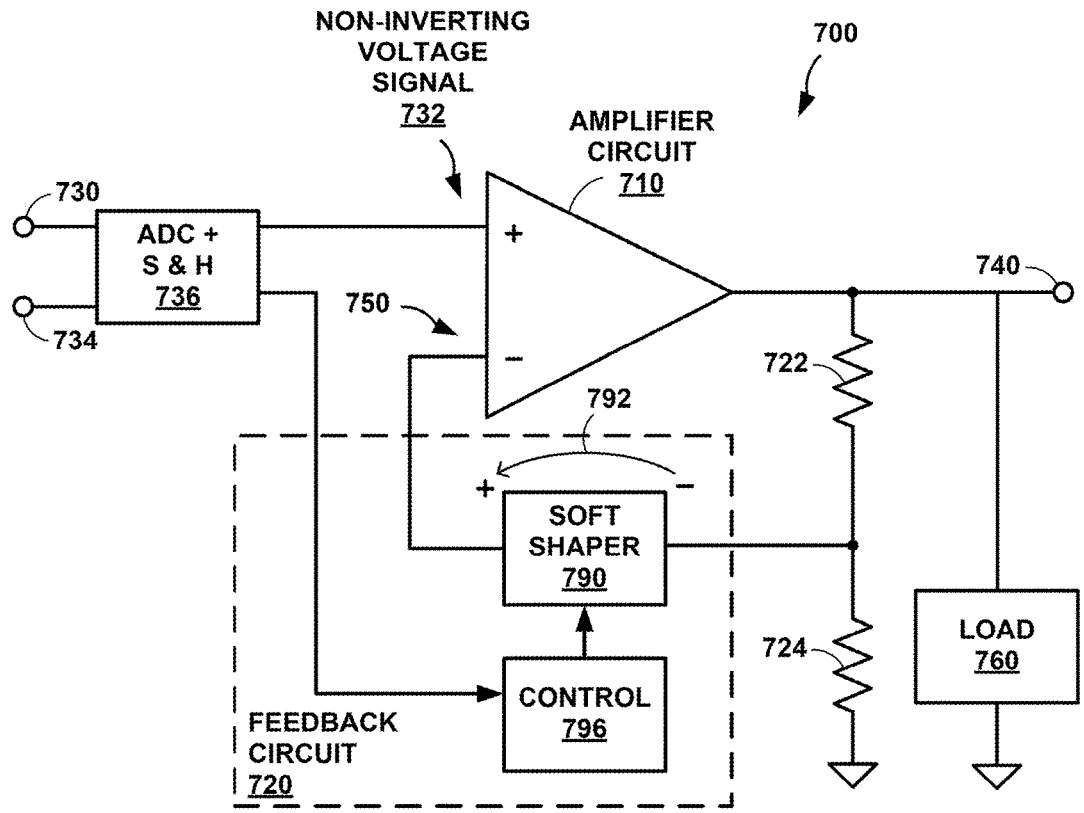
FIGS. 7A and 7B illustrate a circuit and timing diagram for a feedback circuit configured to receive a reference voltage signal from a sample-and-hold circuit, in accordance with some examples of this disclosure.
Figure 7B:
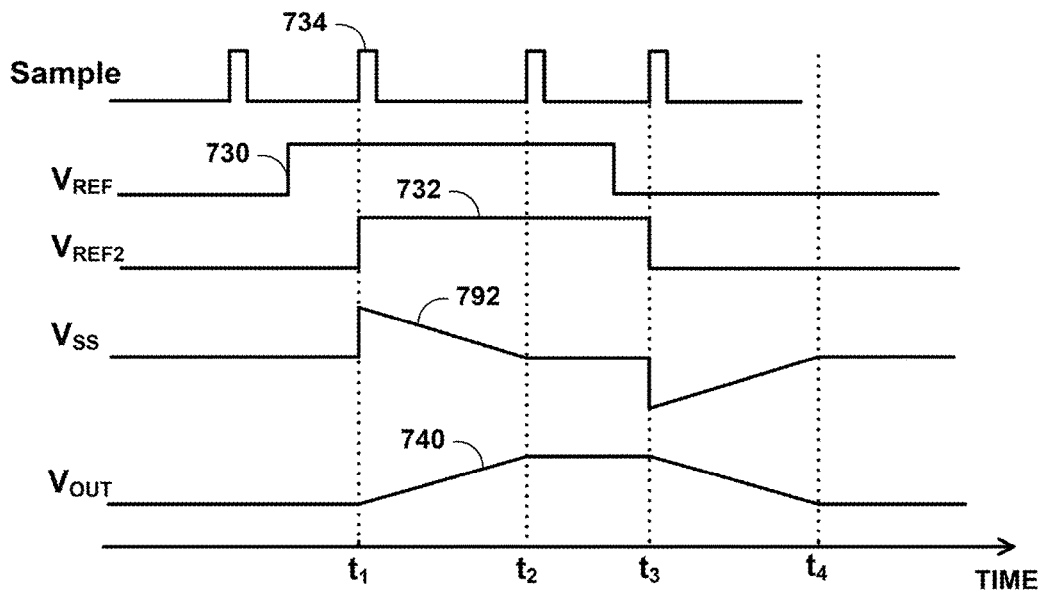

FIGS. 7A and 7B illustrate a circuit and timing diagram for a feedback circuit 720 configured to receive a reference voltage signal 730 from a sample-and-hold circuit 736, in accordance with some examples of this disclosure. Sample-and-hold circuit 736 may be configured to receive and deliver reference voltage signal 730 to feedback circuit 720 before delivering reference voltage signal 730 to amplifier circuit 710 as non-inverting voltage signal 732. Sample-and-hold circuit 736 may also include an analog-to-digital converter (ADC) circuit configured to convert reference voltage signal 730 to a digital signal. The digital signal may encode the amplitude of reference voltage signal 730 and may encode a voltage step in reference voltage signal 730. Sample-and-hold circuit 736 may then be configured to deliver the digital signal to control circuit 796, which may generate a voltage step for voltage level 792 based on the digital signal.

Sample-and-hold circuit 736 may also be configured to receive sample signal 734. Sample-and-hold circuit 736 may be configured to deliver signal 732, as well as the digital signal, when sample signal 734 has an active value. As depicted in FIG. 7B, sample-and-hold circuit 736 may receive and store a voltage step in reference voltage signal 730 before time $t_1$, but sample-and-hold circuit 736 may not deliver the voltage step to amplifier circuit 710 as non-inverting voltage signal 732 until time $t_1$ when sample-and-hold circuit 736 receives a pulse in sample signal 734. The delay in sample-and-hold circuit 736 delivering non-inverting voltage signal 732 to amplifier circuit 710 may allow control circuit 796 time to cause soft-shaper circuit 790 to generate a voltage step in voltage level 792 that is contemporaneous to the voltage step in non-inverting voltage signal 732. Sample-and-hold circuit 736 may be configured to deliver reference voltage signal 730 to amplifier circuit 710 concurrently with the voltage step in voltage level 792.

When sample signal 734 has a pulse at time $t_3$, sample-and-hold circuit 736 may deliver a negative voltage step in signal 732 to amplifier circuit 710. Sample-and-hold circuit 736 may also deliver a negative voltage step in a digital signal to control circuit 796, and control circuit 796 may cause a negative voltage step in voltage level 792.

Figure 8A:
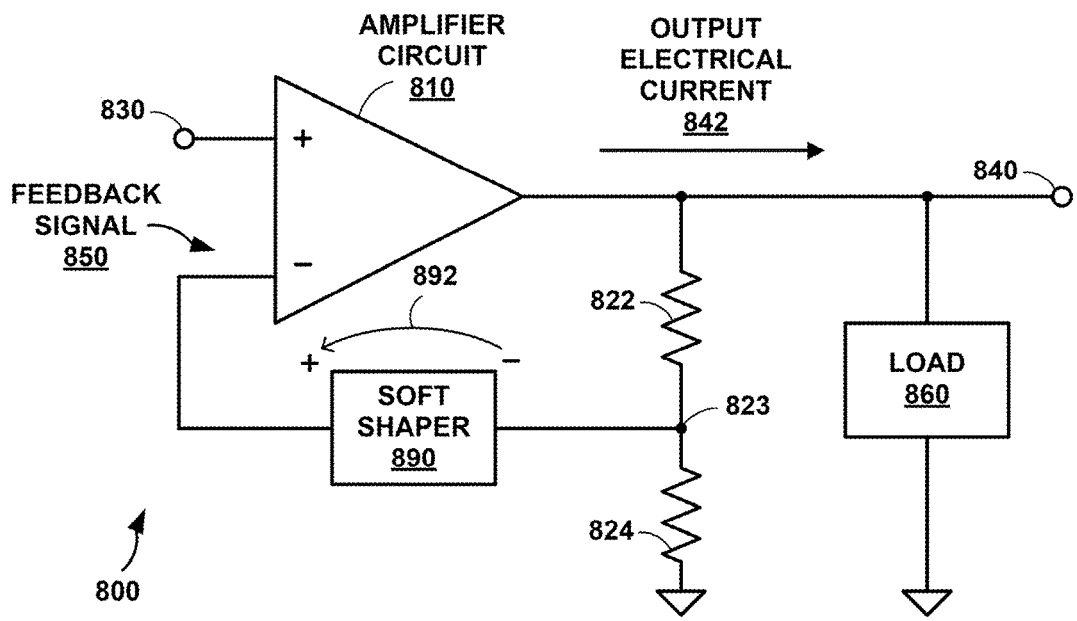
FIGS. 8A and 8B illustrate a circuit and timing diagram for a feedback circuit and a voltage divider circuit, in accordance with some examples of this disclosure.
Figure 8B:
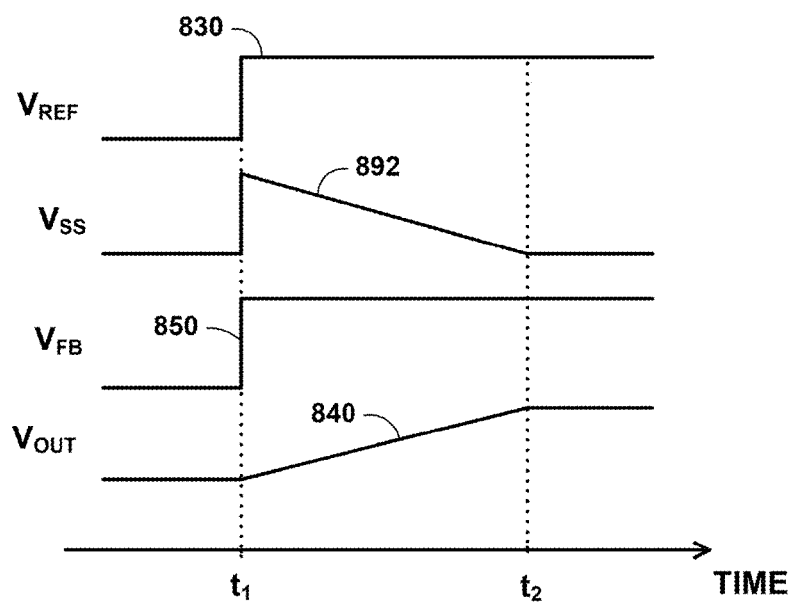

FIGS. 8A and 8B illustrate a circuit and timing diagram for a feedback circuit and a voltage divider circuit, in accordance with some examples of this disclosure. The voltage divider circuit may include divider elements 822 and 824 and intermediate node 823. The voltage divider circuit may be configured to receive output voltage signal 840 and deliver a divided voltage signal to soft-shaper circuit 890 at intermediate node 823. Divider elements 822 and 824 may be resistors and/or capacitors.

Device 800 does not require a circuit to detect the end of the soft-shaping phase, because the soft-shaping phase ends when voltage level 892 decreases down to zero. Soft-shaper circuit 890 can generate voltage level 892 with an electrical current that decreases, increases, and/or ramps to zero, where the electrical current flows on a resistor (e.g., current source 994 and resistor 990 of FIG. 9A). When voltage level 992 returns to zero, the soft-shaping event ends without any other action or detection needed. Device 800 may include low-cost technology, and trimming can be applied to achieve increased precision.

Table I compares the soft-shaper approach (e.g., FIGS. 6A-17) to low-pass filtering a reference voltage signal (e.g., FIG. 4) and constant-current capacitance charging approach (e.g., FIG. 5). Text with upper-case letters represents an advantage, while text with lower-case letters indicates a limitation.

TABLE I

Comparison of soft-shaping and two other methods

| Feature: | Soft-shaper | Low-pass filtering | Constant-current capacitive charging |
|---|---|---|---|
| Regulated voltage slope is linear | YES | no | YES |
| Regulated voltage slope is independent from reference voltage signal | YES | no | YES |
| Reference voltage signal driving current capability needed | NO | yes | yes |
| Operates for both reference voltage signal step polarities | YES | YES | no |
| "End of soft-shaping" detection needed | NO | NO | yes |

Regarding the last row in Table I, the constant-current capacitance charging approach may need a circuit to detect the end of soft-shaping event or charging event. The circuit may close switch 534 in FIG. 5 when the end of the charging event occurs, such that the voltage level on both sides of switch 534 is equal. The low-pass filtering approach of FIG. 4 may not need to detect the end of a soft-shaping event because no electrical current flows on the non-inverting input of amplifier circuit 410.

Figure 9A:
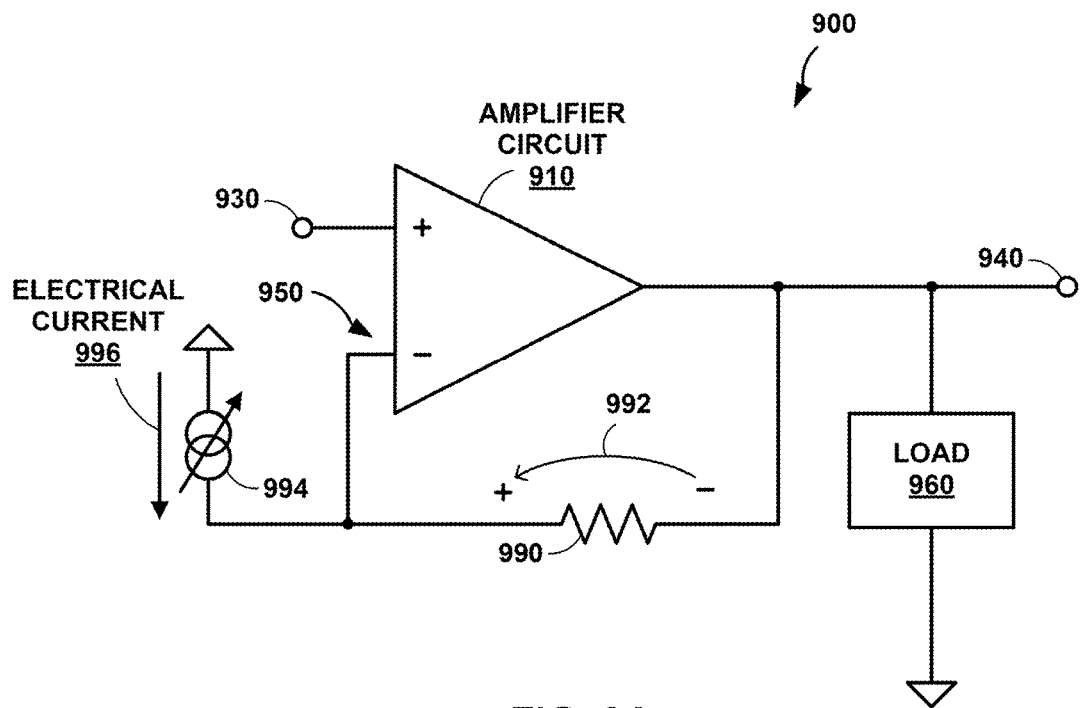
FIGS. 9A-9C illustrate a circuit and timing diagram for a feedback circuit including a variable current source and a resistor, in accordance with some examples of this disclosure.
Figure 9B:
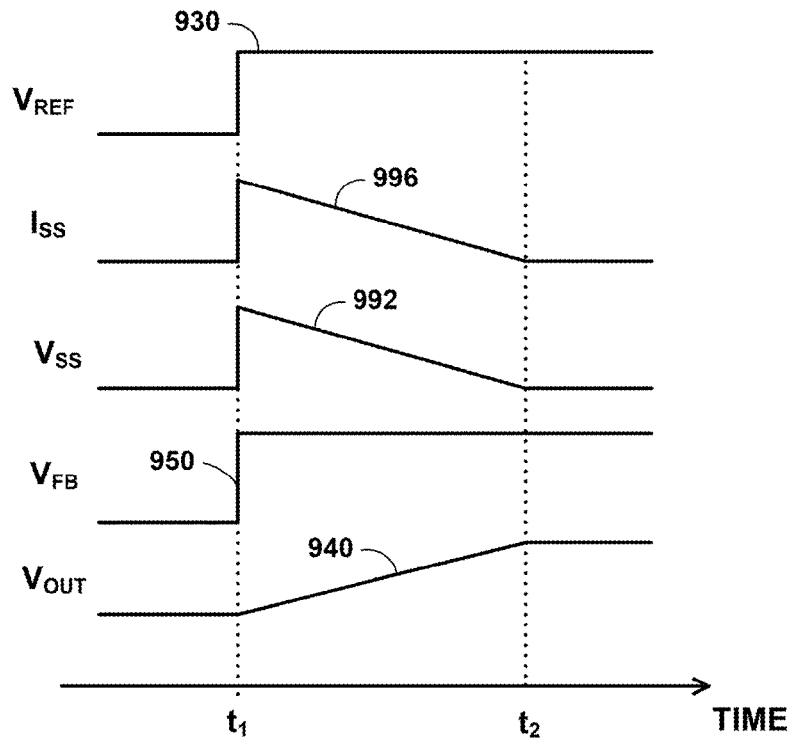

FIGS. 9A and 9B illustrate a circuit and timing diagram for a feedback circuit including a variable current source 994 and a resistor 990, in accordance with some examples of this disclosure. Variable current source 994 may be configured to deliver an electrical current to resistor 990 to generate voltage level 992 across resistor 990. Device 900 may include a feedback circuit configured to sense a voltage step in reference voltage signal 930 and cause variable current source to deliver an electrical current to resistor 990 to cause a voltage step in voltage level 992. The "soft-shaper circuit" of device 900 may include resistor 990 and variable current source 994.

FIG. 9B depicts a current step in electrical current 996 delivered by variable current source 994. The voltage level of feedback signal 950 may remain stable after the voltage step at time $t_1$ because, as voltage level 992 ramps down, output voltage signal 940 ramps up. The ramping of signals 940 and 992 may cancel out in feedback signal 950 because the amplitude of feedback signal 950 may be equal to the sum of the amplitudes of output voltage signal 940 and voltage level 992. The regulation loop of device 900 is configured in unitary feedback, thus in steady-state the amplitude of output voltage signal 940 is equal to the amplitude of reference voltage signal 930, as shown in Equation (3).

$$V_{out} = V_{REF} \quad (3)$$

If reference voltage signal 930 has a positive voltage step, as show in FIG. 9B, variable current source 994 may generate a positive voltage step in electrical current 996. Variable current source 994 may deliver electrical current 996 to resistor 990, which is $R_{SS}$ in Equations (4) and (5) below. In steady-state conditions, such as before time $t_1$ and after time $t_2$, electrical current 996 may be equal to zero. Electrical current 996 may reach a peak value ($I_{SS\_peak}$) at time $t_1$ to offset the voltage step in reference voltage signal 930 ($\Delta V_{REF}$).

$$I_{SS\_peak} = \frac{\Delta V_{REF}}{R_{SS}} \quad (4)$$

Then variable current source 994 may cause electrical current 996 to decrease to zero within a timeframe corresponding to the duration of the soft-shaping phase. In general, in steady-state as well as during soft-shaping, output voltage signal 940 can be expressed as:

$$V_{out} = V_{REF} - I_{SS} R_{SS} \quad (5)$$

The soft-shaper can be equivalently implemented with an amplitude of electrical current 996 at zero in steady-state and at a constant nonzero amplitude during the soft-shaping phase, and a variable resistor during the soft-shaping phase to produce a ramping signal. In this implementation, the voltage level generated by a current source may be constant and non-null during the soft-shaping phase, and a variable resistor may increase in resistance with time to decrease the electrical current through the resistor. The resistor may be realized as an array of resistors and switches in parallel, with a signal driving the switches to control the total equivalent resistance. Such an implementation with a constant current source or constant voltage source may work for any device of FIGS. 9A-17.

Figure 9C:
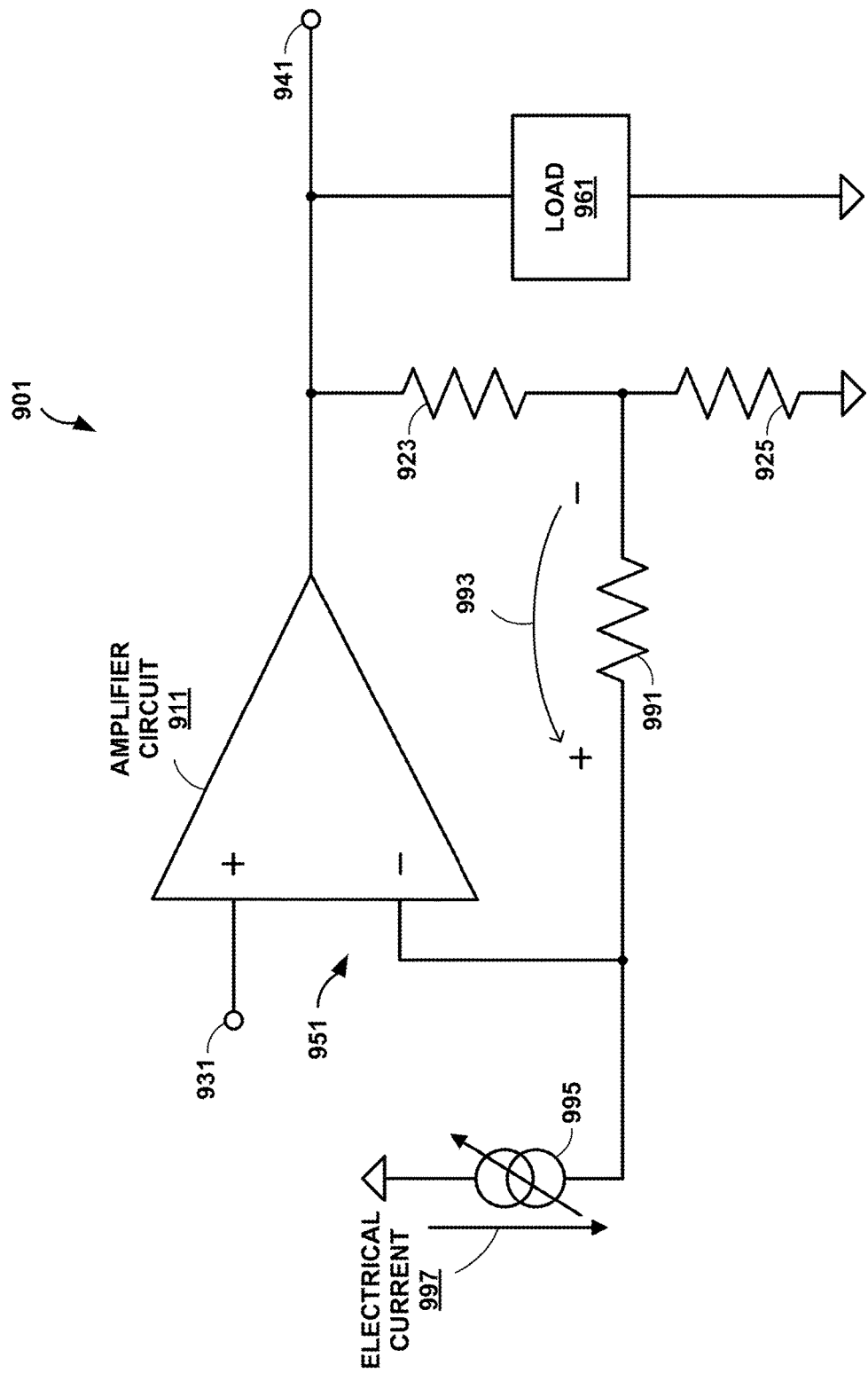

FIG. 9C illustrates a feedback circuit including a variable current source 995 and a divider circuit including resistors 923 and 925, in accordance with some examples of this disclosure. The soft-shaper circuit of device 901 in FIG. 9C is implemented in a regulation loop with a non-unitary feedback configuration. Output voltage signal 941 (e.g., the voltage drop across electrical load 961) can be expressed both in steady-state and soft-shaping phase as shown in Equation (6), where resistor 923 is $R_1$, resistor 925 is $R_2$, resistor 991 is $R_{SS}$, and electrical current 997 is $I_{SS}$.

$$V_{out} = \frac{R1 + R2}{R2}\left[V_{REF} - I_{SS}\left(\frac{R1R2 + R2R_{SS} + R1R_{SS}}{R1 + R2}\right)\right] \quad (6)$$

The peak value of $I_{SS}$ at the beginning of the soft-shaping phase is:

$$I_{SS\_peak} = \Delta V_{REF}\left(\frac{R1 + R2}{R1R2 + R2R_{SS} + R1R_{SS}}\right) \quad (7)$$

In some examples, resistor 923 may be forty kilo-ohms, resistor 925 may be ten kilo-ohms, resistor 991 may be one hundred kilo-ohms, and electrical load may have an impedance of one hundred ohms. The soft-shaper circuit of devices 900 and 901 (e.g., resistors 990 and 991 and current sources 994 and 995) are two possible implementations of the techniques of this disclosure.

Figure 10A:
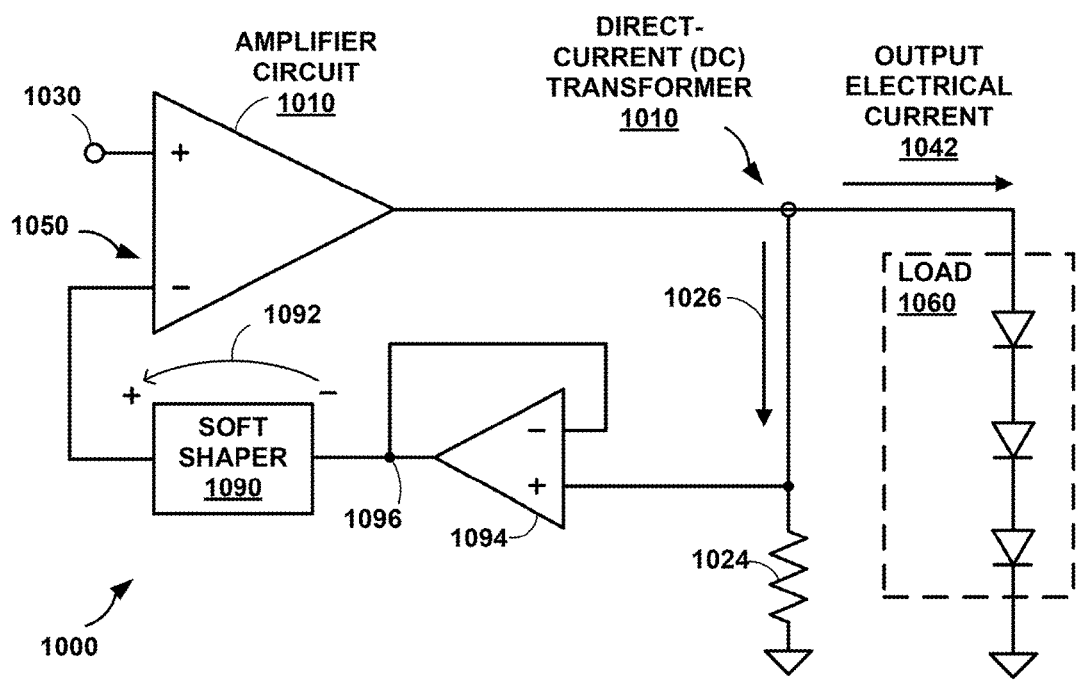
FIGS. 10A and 10B illustrate a circuit and timing diagram for a feedback circuit including a current sense and a buffer circuit, in accordance with some examples of this disclosure.
Figure 10B:
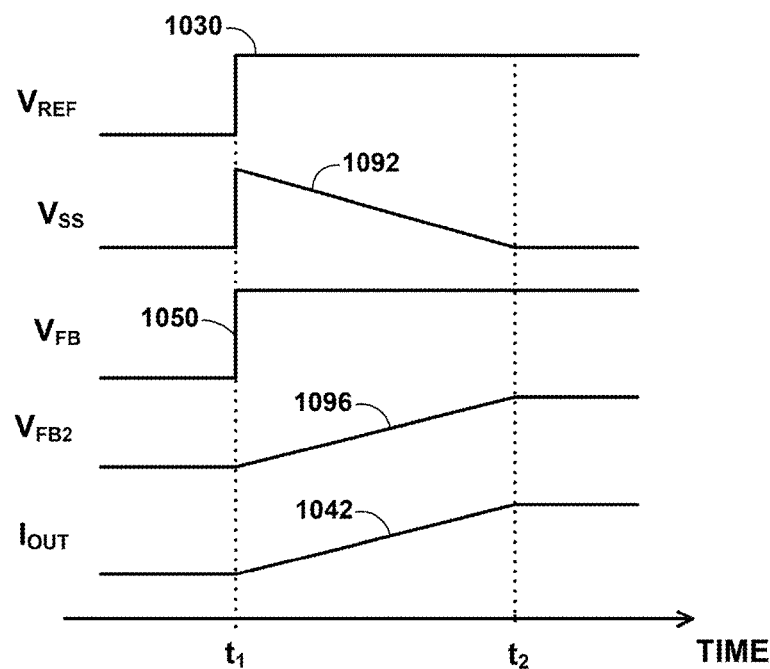

FIGS. 10A and 10B illustrate a circuit and timing diagram for a feedback circuit including a current sense and a buffer circuit 1094, in accordance with some examples of this disclosure. Sensed electrical current 1026 may have an amplitude that is equal to, a fraction of, or a multiple of output electrical current 1042. Optional DC transformer 1028 may be configured to generate sensed electrical current 1026 based on output electrical current 1042. Optional DC transformer 1028 may also provide galvanic isolation between electrical load 1060 and buffer circuit 1094. Electrical load 1060 may not necessarily include a chain of LEDs in all examples. The circuitry of device 1000 may also be applicable to other electrical loads.

Buffer circuit 1094 may be configured to generate and deliver buffered voltage signal 1096 to soft-shaper circuit 1090 based on sensed electrical current 1026. Buffer circuit 1094 may generate buffered voltage signal with low output impedance such that the impedance of soft-shaper circuit 1090 has little or no effect on the voltage level of buffered voltage signal 1096. Buffer circuit 1094 may also decouple the impedance of soft-shaper circuit 1090 from the impedance of resistor 1024. The voltage level of buffered voltage signal 1096 may be equal to the voltage across resistor 1024. As shown in FIG. 10B, the voltage level of buffered voltage signal 1096 may ramp up with output electrical current 1042 to match the ramp-down of voltage level 1092 as voltage level 1092 ramps to zero. The amplitude of sensed electrical current 1026 may be equal to the amplitude of output electrical current 1042 multiplied by a coefficient of DC transformer 1010. The amplitude of buffered voltage signal 1096 may be equal to the amplitude of sensed electrical current 1026 multiplied by the resistance of resistor 1024.

Figure 11A:
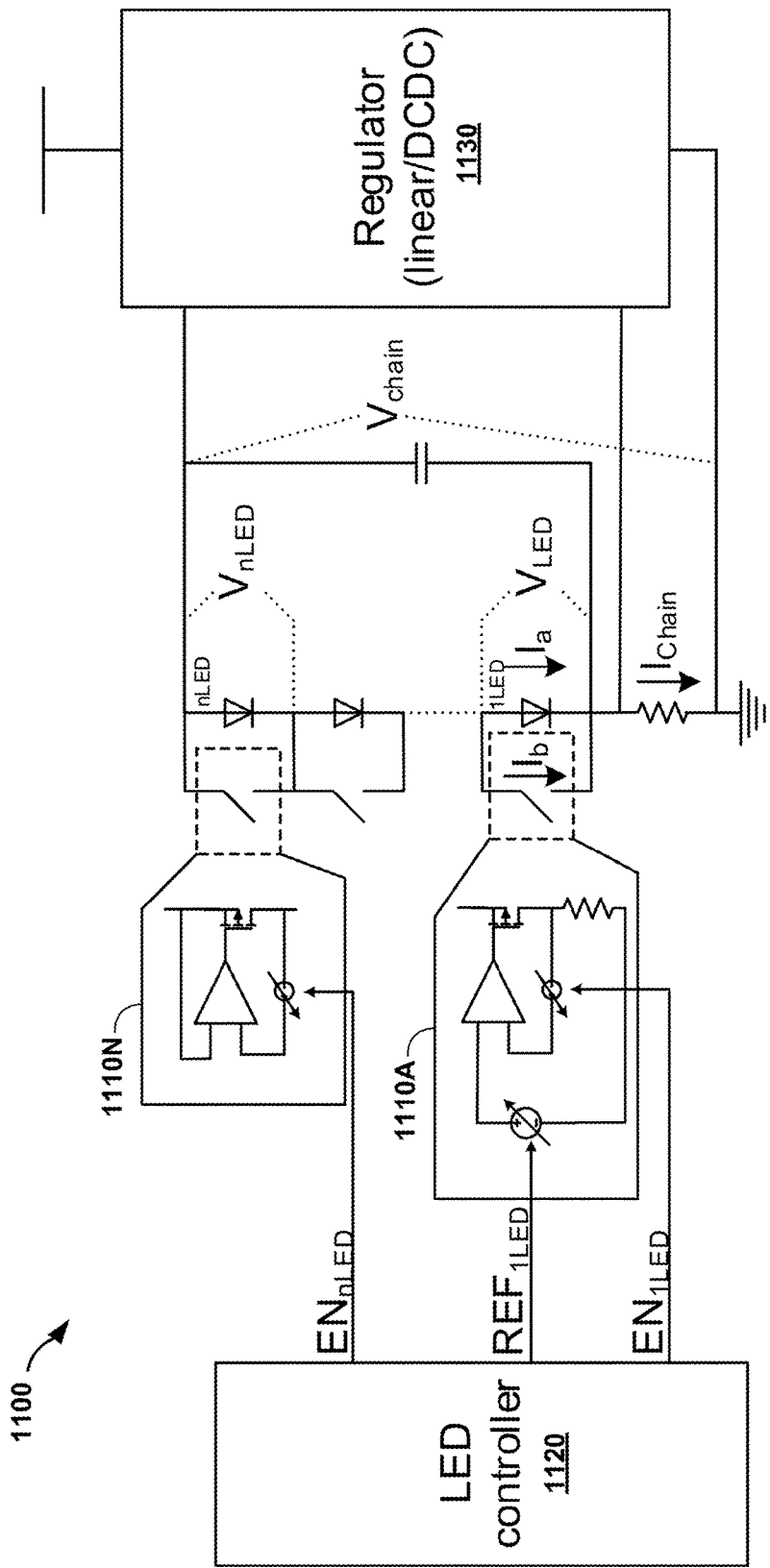
FIGS. 11A and 11B illustrate a circuit and timing diagram for a chain of light emitting diodes (LEDs) driven by low-dropout circuits, in accordance with some examples of this disclosure.
Figure 11B:
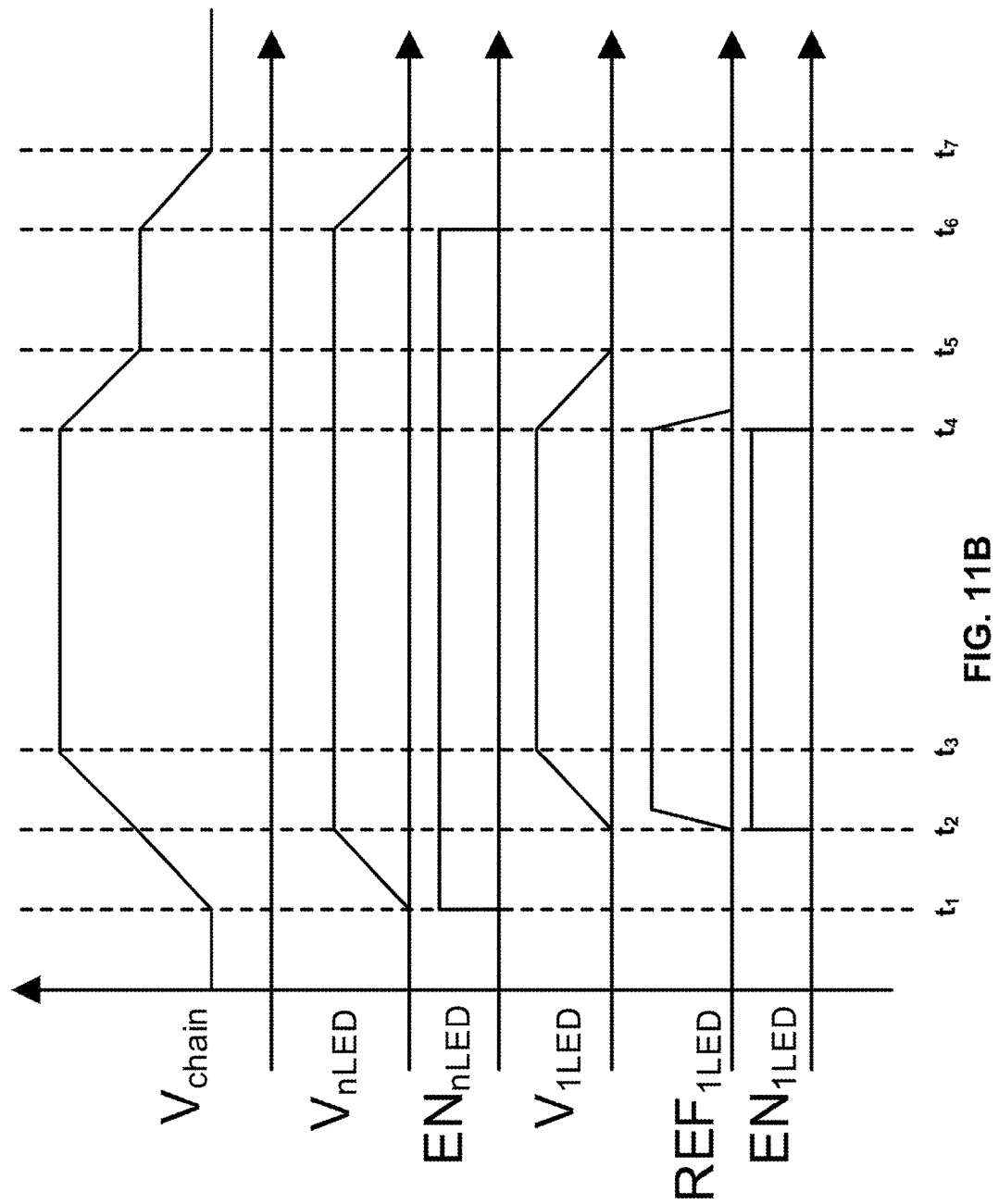

FIGS. 11A and 11B illustrate a circuit and timing diagram for a chain of LEDs driven by low-dropout (LDO) circuits 1110A and 1110N, in accordance with some examples of this disclosure. Device 1100 may include N number of LEDs electrically connected in series. The LEDs may receive electrical power from regulator 1130, which may supply a DC current signal. LED controller 1120 (e.g., a control circuit) may be configured to control the operation of LDO circuits 1110A and 1110N. The amplifier circuits of LDO circuits 1110A and 1110N may be configured to control whether each LED is active based on the output voltage signals of the amplifier circuits. In some examples, circuits 1110A and 1110N may include voltage regulation circuits and/or current regulation circuits in alternative or in addition to LDOs.

Instead of only a switch, LDO circuits 1110A and/or 1110N may include an amplifier circuit and a feedback circuit with soft-shaping capabilities. If certain LEDs need a different level of electrical current, for example to produce different light characteristics, the LDO circuits may be configured to drive those LEDs independently. Therefore, each LDO circuit may be fully independent of the other LDO circuits in the chain. The soft-shaping of low-dropout circuits 1110A and 1110N may be configured to match the performance of regulator 1130 and prevent overstress in each respective LED.

As depicted in FIG. 11B, regulator 1130 may begin increasing the chain voltage at time $t_1$. LED controller 1120 may deliver enable signal $EN_{nLED}$ to LDO circuit 1110N at time $t_1$ to initialize the soft-shaping process for nLED. LED controller 1120 may deliver enable signal $EN_{1LED}$ to LDO circuit 1110A at time $t_2$ to initialize the soft-shaping process for 1LED. In some examples, LED controller 1120 may also deliver signal $REF_{1LED}$ to LDO circuit 1110A at time $t_2$ to initialize the reference voltage signal for 1LED. LED controller 1120 may deliver enable signals to initialize the soft-shaping process for LEDs based on the operation of regulator 1130 in order to avoid overstress conditions.

A control circuit of LDO circuit 1110A may be configured to receive a first enable signal ($REF_{1LED}$) and cause a reference voltage circuit to generate a voltage step in a reference voltage signal for LDO circuit 1110A in response to receiving the first enable signal. The reference voltage circuit may generate the voltage step in the reference voltage signal by closing a switch to electrically connect an input of the amplifier circuit to the reference voltage circuit. The control circuit of LDO circuit 1110A may also be configured to receive a second enable signal ($EN_{1LED}$). The control circuit cause a feedback circuit to generate a voltage step in a feedback signal concurrently with causing the reference voltage circuit to generate the voltage step in the reference voltage signal in response to receiving the second enable signal.

Figure 12A:
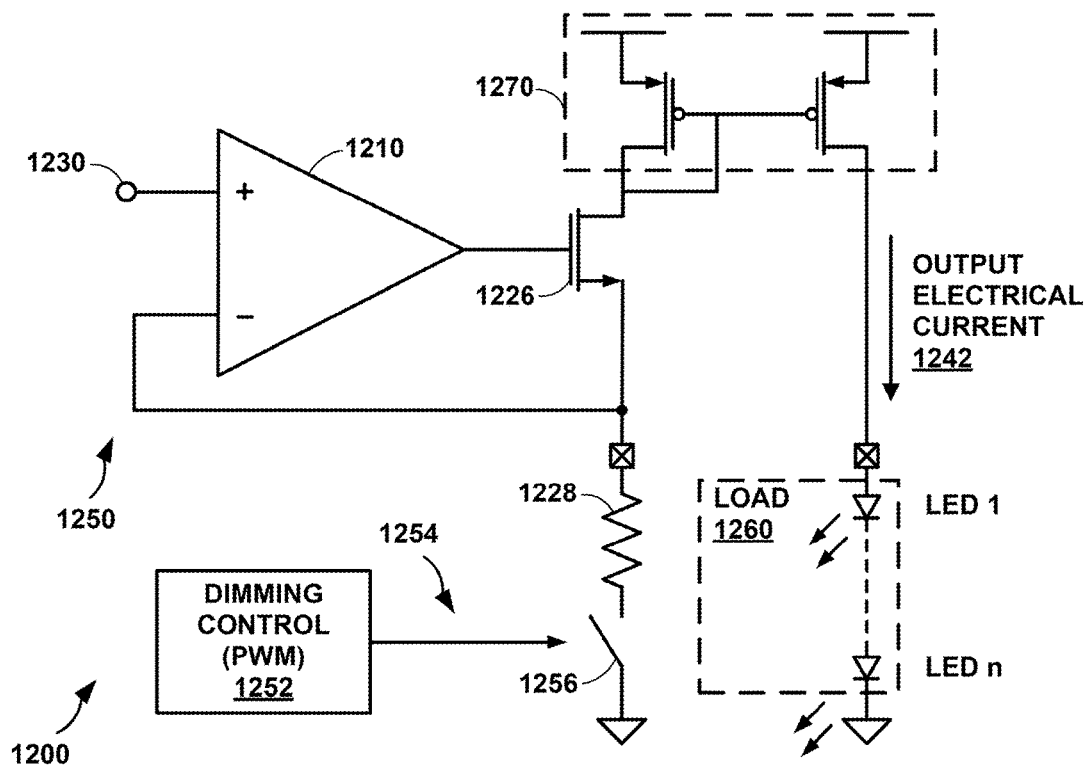
FIGS. 12A and 12B illustrate a circuit and timing diagram for the operation of a control circuit configured to dim a chain of LEDs.
Figure 12B:
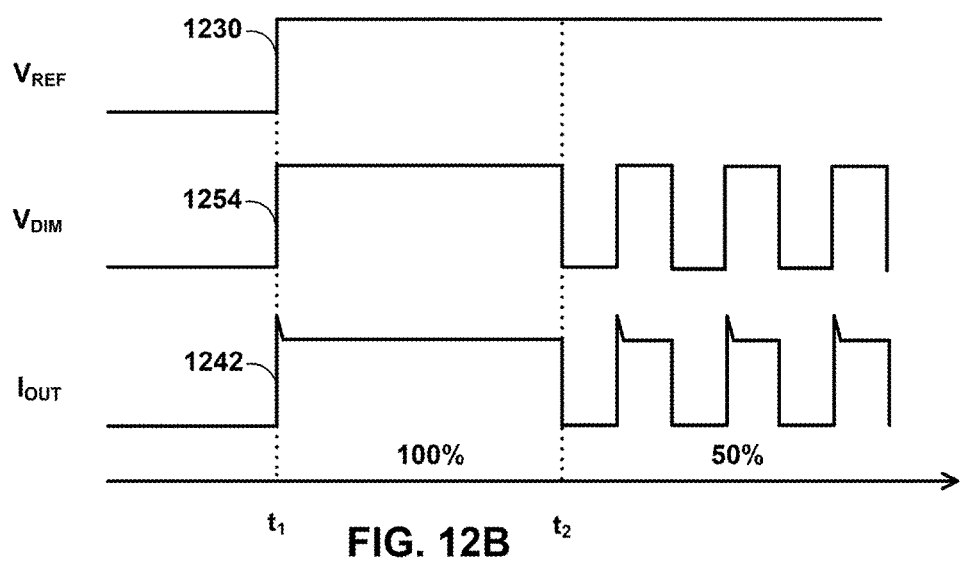

FIGS. 12A and 12B illustrate a circuit and timing diagram for the operation of a control circuit 1252 configured to dim a chain of LEDs. When dimming control circuit 1252 delivers control signal 1254 to switch 1256 to produce a duty cycle of one hundred percent between times $t_1$ and $t_2$, the amplitude of output electrical current 1242 is based on the voltage level across resistor 1228 (e.g., $V_{DIM}$). After time $t_2$, control circuit 1252 may deliver control signal 1254 with a duty cycle of fifty percent, causing a duty cycle of fifty percent in output electrical current 1242. If the switching frequency of control signal 1254 is fast enough, a human eye may not perceive the blinking of the LEDs of electrical load 1260. The human eye may perceive the dimness of the light generated by electrical load 1260 as proportional to the duty cycle of control signal 1254. Control circuit 1252 may be configured to dim the LEDs using amplitude modulation (AM), pulse-width modulation (PWM), or a combination of AM and PWM.

Figure 13A:
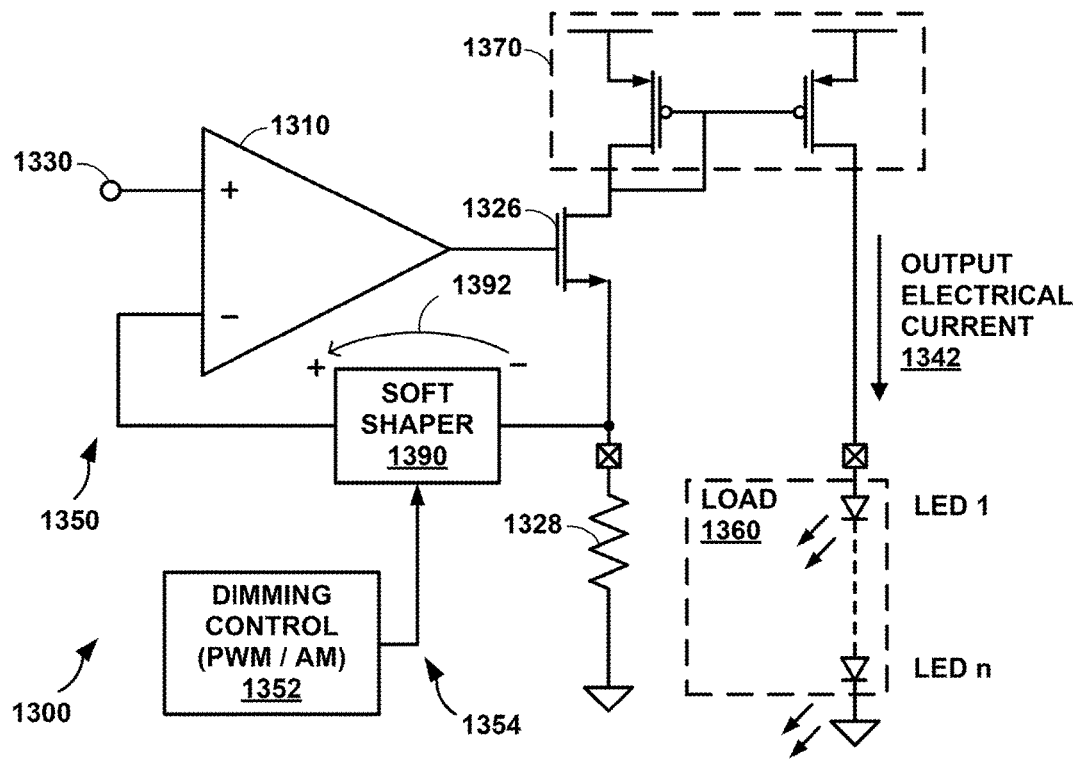
FIGS. 13A and 13B illustrate a circuit and timing diagram for a control circuit configured to dim a chain of LEDs by controlling the voltage level of a feedback signal, in accordance with some examples of this disclosure.
Figure 13B:
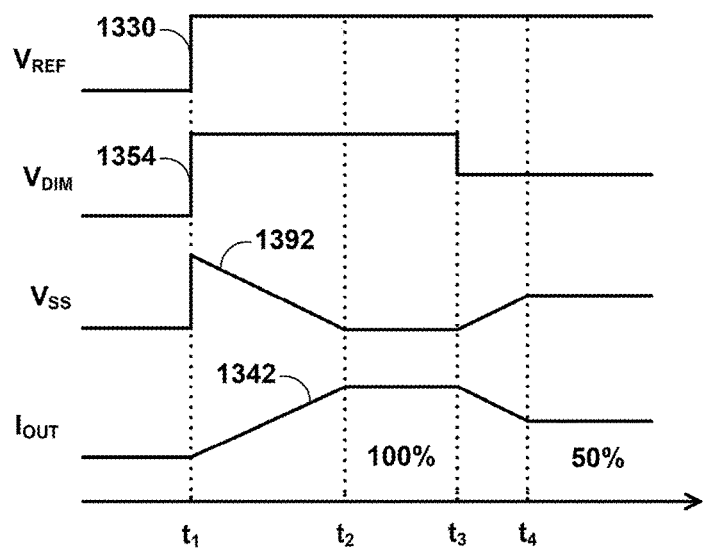

FIGS. 13A and 13B illustrate a circuit and timing diagram for a control circuit 1352 configured to dim a chain of LEDs (e.g., electrical load 1360) by controlling the voltage level of a feedback signal 1350, in accordance with some examples of this disclosure. Control circuit 1352 may be configured to control whether the LEDs of electrical load 1360 are dimmed by at least controlling voltage level 1392 across soft-shaper circuit 1390. In response to a voltage step in reference voltage signal 1330 at time $t_1$, control circuit 1352 may cause an approximately equal voltage step in voltage level 1392. Control circuit 1352 may then be configured to ramp down voltage level 1392 such that output electrical current 1342 increases to one hundred percent electrical power delivered to electrical load 1360. At time $t_3$, control circuit 1352 may be configured to begin decreasing the electrical power delivered to electrical load 1360 to fifty percent in order to dim the LEDs.

The LEDs of device 1300 may experience less stress, as compared to the LEDs of device 1200. The LEDs of device 1200 may switch between on and off at a relatively high frequency in order to dim the light emitted. In contrast, the LEDs of device 1300 may be configured to receive output electrical current 1342 at a lower amplitude in order to dim the light emitted. The feedback loop of device 1300 may operate in steady-state with soft fluctuations, rather than switching on and off like resistor 1228 and switch 1256. Amplifier circuit 1310 may have relaxed specifications, as compared to amplifier circuit 1210, such as a lower slew rate, lower stability requirements, and lower speed.

Figure 14:
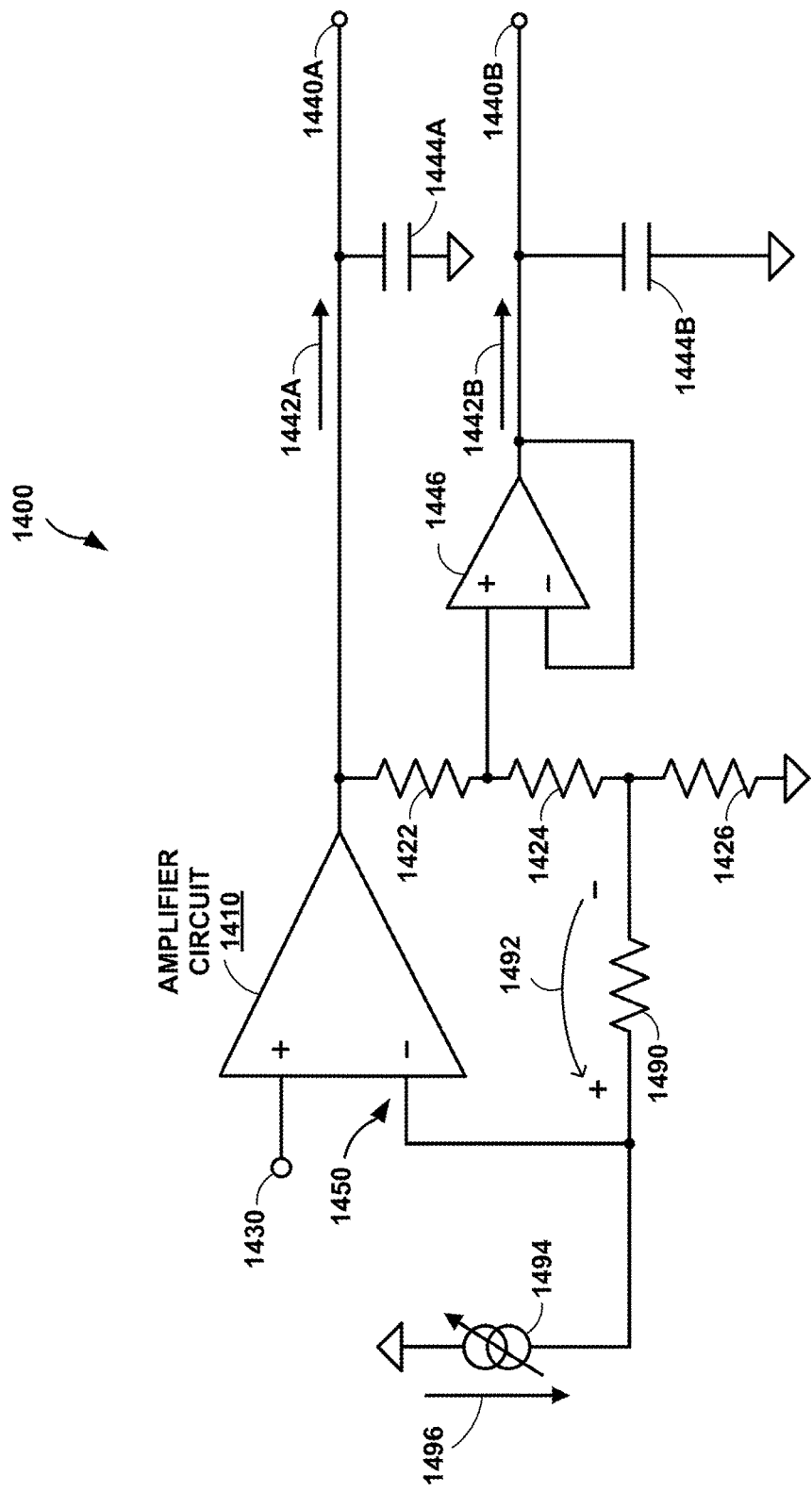
FIG. 14 illustrates a circuit diagram of an amplifier circuit configured to generate two output voltage signals, in accordance with some examples of this disclosure.

FIG. 14 illustrates a circuit diagram of an amplifier circuit 1410 configured to generate two output voltage signals 1440A and 1440B, in accordance with some examples of this disclosure. Device 1400 may be configured to supply output voltage signals 1440A and 1440B to multiple supply domains. When the start-up event occurs (e.g., when reference voltage signal 1430 goes from zero to one volts), current source 1494 and amplifier circuit 1410 may be configured to softly sweep output voltage signals 1440A and 1440B to the steady-state values. The soft shaping of output voltage signals 1440A and 1440B may reduce the peak values of output electrical currents 1442A and 1442B that charge capacitors 1444A and 1444B, thus reducing the overshoot of voltage signals 1440A and 1440B. Amplifier circuit 1410 and buffer circuit 1446 may be configured to generate output electrical currents 1442A and 1442B.

Device 1400 may include a voltage divider circuit including resistors 1422, 1424, and 1426. The voltage divider circuit may be configured to generate and deliver a first divided voltage signal to buffer circuit 1446. The voltage divider circuit may also be configured to generate and deliver a second divided voltage signal to the soft-shaper circuit (e.g., resistor 1490 and current source 1494). Buffer circuit 1446 may be configured to convert the first divided voltage signal to output voltage signal 1442B, which may have the same voltage level as the first divided voltage signal but with lower impedance at the output of buffer circuit 1446.

Figure 15:
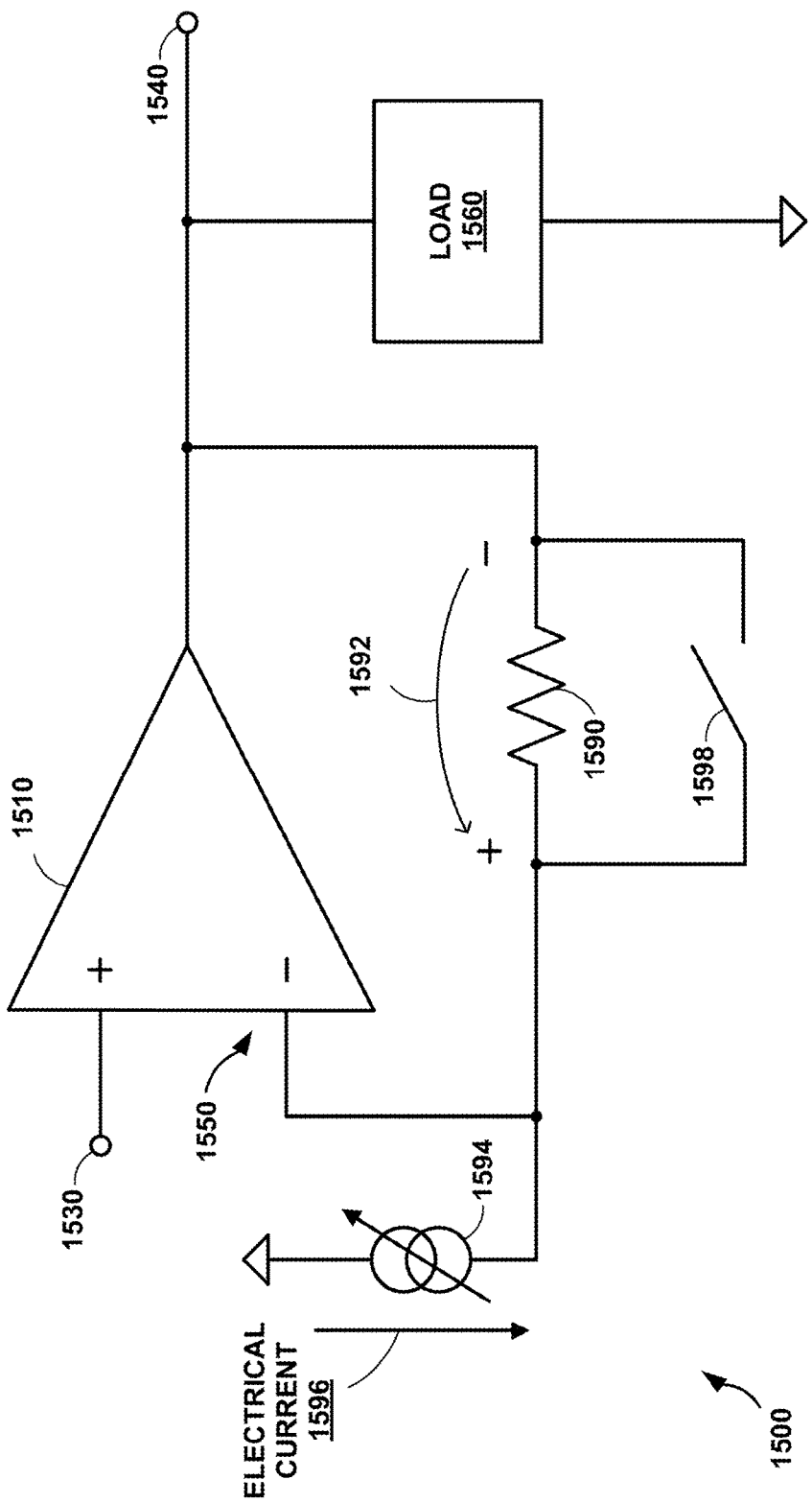
FIG. 15 illustrates a circuit diagram of a feedback circuit including a resistor and a switch electrically connected in parallel, in accordance with some examples of this disclosure.

FIG. 15 illustrates a circuit diagram of a feedback circuit including a resistor 1590 and a switch 1598 electrically connected in parallel, in accordance with some examples of this disclosure. Switch 1598 may be open during a soft-shaping phase, and closed during steady state to electrically connect feedback signal 1550 to output voltage signal 1540. Switch 1598 may improve the stability of a fast loop by reducing the phase lag due to the time constant of the loop. The time constant may be based on the resistance of resistor 1590 and the parasitic capacitance at the inverting pin of amplifier circuit 1510 (e.g., the node that receives feedback signal 1550). Switch 1598 may also reduce possible regulation errors due to currents flowing to/from the non-inverting pin of amplifier circuit 1510 during steady-state operation.

Figure 16:
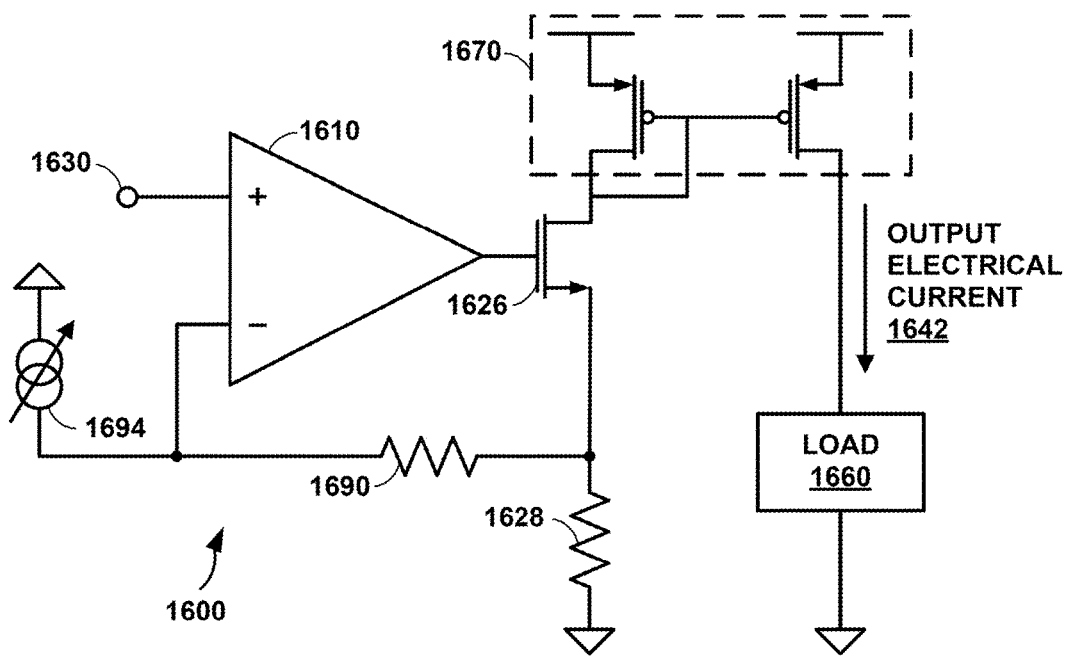
FIGS. 16 and 17 illustrate circuit diagrams of two additional examples of feedback circuits including variable current sources, in accordance with some examples of this disclosure.
Figure 17:
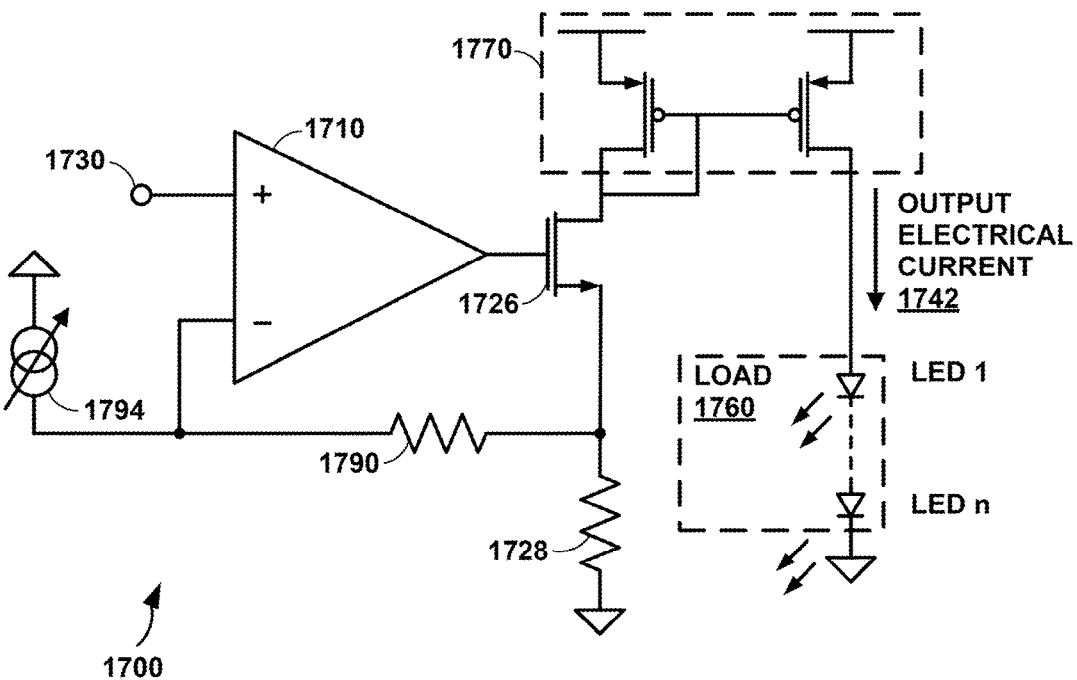

FIGS. 16 and 17 illustrate circuit diagrams of two additional examples of feedback circuits including variable current sources 1694 and 1794, in accordance with some examples of this disclosure. Variable current source 1694 may be configured to drive an electrical current to an input of amplifier circuit 1610 and resistors 1690 and 1628.

Variable current source 1794 may be configured to drive an electrical current to an input of amplifier circuit 1710 and to resistors 1790 and 1728. Devices 1600 and 1700 may also include current sources or current mirrors 1670 and 1770 configured to deliver output electrical currents 1642 and 1742 to electrical loads 1660 and 1760 based on the geometric ratios of current sources 1670 and 1770.

Figure 18:
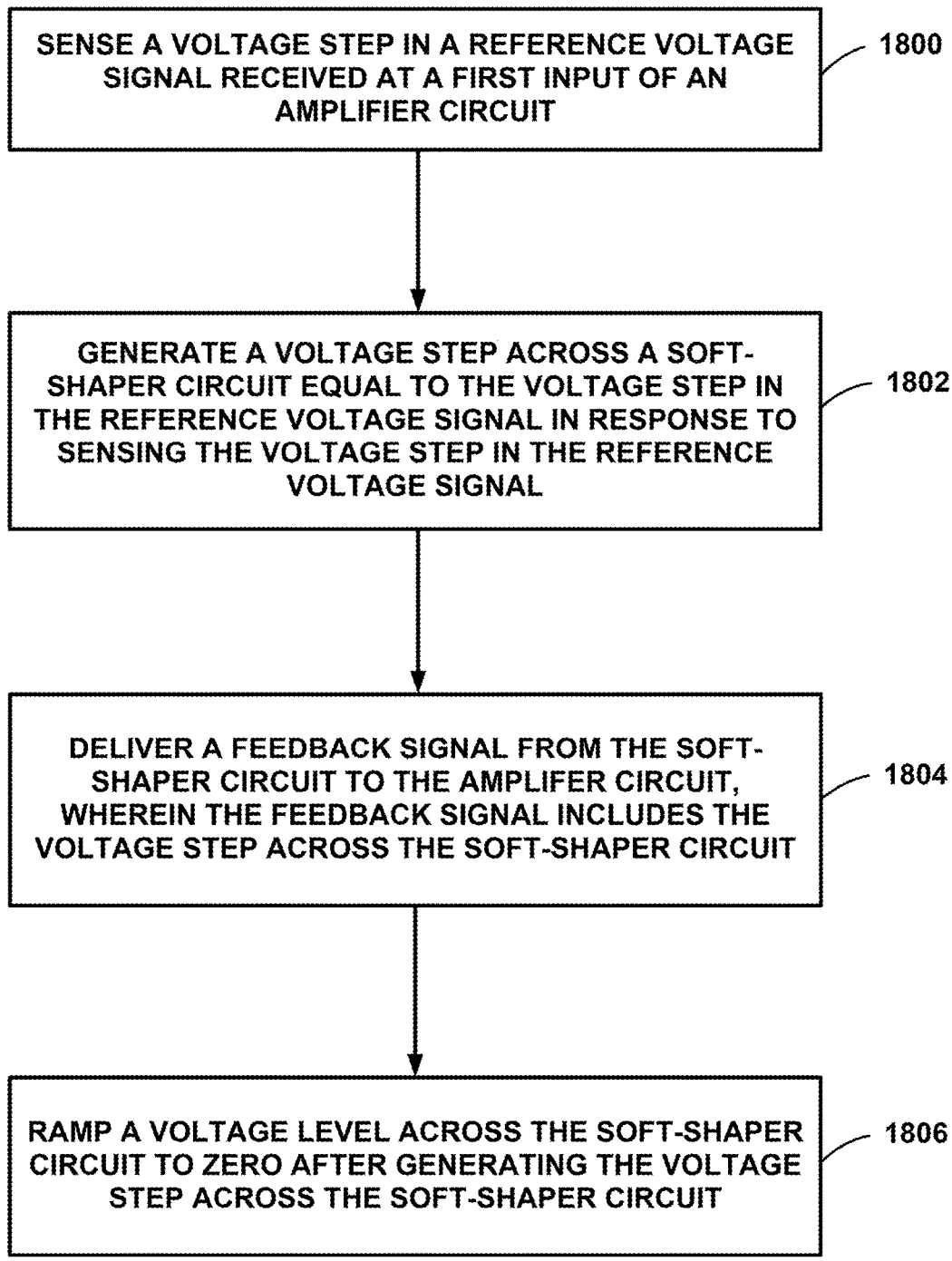
FIG. 18 is a flowchart illustrating example technique for generating a feedback signal, in accordance with some examples of this disclosure.

FIG. 18 is a flowchart illustrating example techniques for generating a feedback signal, in accordance with some examples of this disclosure. The example techniques of FIG. 18 are described with reference to device 100 in FIG. 1, although other components, such as the devices of FIGS. 6-11, and 13-17, may exemplify similar techniques.

In the example of FIGS. 1 and 18, feedback circuit 120 senses a voltage step in reference voltage signal 130 received at input 112A of amplifier circuit 110 (1800 in FIG. 18). Feedback circuit 120 may include a sensing circuit such as a sample-and-hold circuit that is configured to receive reference voltage signal 130. In the example of FIGS. 1 and 18, feedback circuit 120 generates a voltage step across soft-shaper circuit 190 approximately equal to the voltage step in reference voltage signal 130 in response to sensing the voltage step in reference voltage signal 130 (1802 in FIG. 18). Feedback circuit 120 may cause a current source to deliver an electrical current to a resistor to generate a voltage step. Feedback circuit 120 may control the amplitude of the voltage step by activating one or more switches to deliver the electrical current from the current source to the resistor.

In the example of FIGS. 1 and 18, feedback circuit 120 may deliver feedback signal 150 from soft-shaper circuit 190 to input 112B of amplifier circuit 110 (1804 in FIG. 18). Feedback signal 150 includes the voltage step in voltage level 192 across soft-shaper circuit 190. The voltage step in voltage level 192 may be approximately equal to the voltage step in reference voltage signal 130, such that amplifier circuit 110 does not generate a voltage step in output voltage signal 140. In the example of FIGS. 1 and 18, feedback circuit 120 ramps voltage level 192 across soft-shaper circuit 190 to zero after generating the voltage step in voltage level 192 (1806 in FIG. 18). Feedback circuit 120 may ramp voltage level 192, for example, by reducing the electrical current generated by a variable current source and delivered to a resistor. The ramping of voltage level 192 may reduce in-rush electrical currents and overshoots at the output node of device 100.

The following numbered examples demonstrate one or more aspects of the disclosure. Each example is described with respect to one or more figures. The reference to one or more figures is not intended to limit the scope of an example to the referenced figures

Example 1

A device includes an amplifier circuit including a first input and a second input. The amplifier circuit is configured to receive a reference voltage signal at the first input of the amplifier circuit, receive a feedback signal at the second input of the amplifier circuit, and generate an output signal based on the reference voltage signal and the feedback signal. In some examples, the device also includes a feedback circuit including a soft-shaper circuit that is electrically connected to the second input of the amplifier circuit. In some examples, the feedback circuit is configured to sense a voltage step in the reference voltage signal, generate a voltage step across the soft-shaper circuit approximately equal to the voltage step in the reference voltage signal in response to sensing the voltage step in the reference voltage signal, and ramp a voltage level across the soft-shaper circuit to zero after generating the voltage step across the soft-shaper circuit.

Example 2

The device of example 1, wherein the feedback circuit is configured to ramp the voltage level across the soft-shaper circuit by at least causing the voltage level across the soft-shaper circuit to linearly return to zero.

Example 3

The device of examples 1-2 or any combination thereof, further including a sample-and-hold circuit configured to receive the reference voltage signal and deliver the reference voltage signal to the feedback circuit before delivering the reference voltage signal to the amplifier circuit. The sample-and-hold circuit is also configured to deliver the reference voltage signal to the amplifier circuit concurrently with the voltage step across the soft-shaper circuit.

Example 4

The device of examples 1-3 or any combination thereof, further including an analog-to-digital converter circuit configured to convert the reference voltage signal to a digital signal and deliver the digital signal to the feedback circuit. The feedback circuit is configured to generate the voltage step across the soft-shaper circuit approximately equal to a voltage step that is encoded in the digital signal.

Example 5

The device of examples 1-4 or any combination thereof, wherein the soft-shaper circuit includes a variable current source and a resistor. The feedback circuit is configured to generate the voltage step across the soft-shaper circuit by at least causing the variable current source to deliver an electrical current to the resistor to generate a voltage drop across the resistor approximately equal to the voltage step in the reference voltage signal in response to sensing the voltage step in the reference voltage signal. The feedback circuit is configured to ramp the voltage level across the soft-shaper circuit by at least ramping the voltage drop across the resistor to zero after generating the voltage drop across the resistor approximately equal to the voltage step in the reference voltage signal.

Example 6

The device of examples 1-5 or any combination thereof, further including a voltage divider circuit configured to receive the output voltage signal and deliver a divided voltage signal to the soft-shaper circuit. The soft-shaper circuit is configured to deliver the feedback signal to the second input of the amplifier circuit by at least delivering the divided voltage signal to the second input of the amplifier circuit in steady state.

Example 7

The device of examples 1-6 or any combination thereof, wherein the amplifier circuit is configured to generate the output voltage signal by at least generating an output electrical current based on the reference voltage signal and the feedback signal. The device further includes a direct-current transformer configured to generate a secondary electrical current based on the output electrical current and a buffer circuit configured to generate a buffered voltage signal based on the secondary electrical current. The feedback circuit is configured to ramp the voltage level across the soft-shaper circuit to zero such that a voltage level of the feedback signal is equal to a voltage level of the buffered voltage signal after generating the voltage step across the soft-shaper circuit.

Example 8

The device of examples 1-7 or any combination thereof, further including a light emitting diode (LED), wherein the amplifier circuit is configured to control whether the LED is active based on the output voltage signal.

Example 9

The device of examples 1-8 or any combination thereof, further including a control circuit configured to receive a first enable signal and cause a reference voltage circuit to generate the voltage step in the reference voltage signal in response to receiving the first enable signal. The control circuit is further configured to receive a second enable signal and cause, concurrently with causing the reference voltage circuit to generate the voltage step in the reference voltage signal, the feedback circuit to generate the voltage step across the soft-shaper circuit approximately equal to the voltage step in the reference voltage signal in response to receiving the second enable signal.

Example 10

The device of examples 8-9 or any combination thereof, wherein the amplifier circuit is a first amplifier circuit, the feedback circuit is a first feedback circuit, the soft-shaper circuit is a second soft-shaper circuit, and the LED is a first LED. The device further includes a second LED electrically connected in series with the first LED and a second amplifier circuit including a first input and a second input. The second amplifier circuit is configured to receive a second reference voltage signal at the first input of the second amplifier circuit, receive a second feedback signal at the second input of the second amplifier circuit, generate a second output signal based on the second reference voltage signal and the second feedback signal, and control whether the second LED is active based on the second output signal. The device further includes a second feedback circuit including a second soft-shaper circuit that is electrically connected to the second input of the second amplifier circuit. The second feedback circuit is configured to sense a voltage step in the second reference voltage signal, generate a voltage step across the second soft-shaper circuit approximately equal to the voltage step in the second reference voltage signal in response to sensing the voltage step in the second reference voltage signal, and ramp a voltage level across the second soft-shaper circuit after generating the voltage step across the second soft-shaper circuit. The device includes a control circuit configured to cause the first feedback circuit to generate the voltage step across the first soft-shaper circuit, cause the second feedback circuit to generate the voltage step across the second soft-shaper circuit, and cause the voltage step in the second reference voltage signal.

Example 11

The device of examples 8-10 or any combination thereof, further including a control circuit configured to control whether the LED is dimmed by at least controlling the voltage level across the soft-shaper circuit.

Example 12

The device of examples 1-11 or any combination thereof, further including a control circuit configured to deliver an enable signal to the feedback circuit. The feedback circuit is configured to generate the voltage step across the soft-shaper circuit in response to receiving sensing the voltage step in the reference voltage signal and in response to receiving the enable signal from the control circuit.

Example 13

The device of examples 1-12 or any combination thereof, wherein the output voltage signal is a first output voltage signal, wherein the device further includes a voltage divider circuit configured to generate a first divided voltage signal and generate and deliver a second divided voltage signal to the soft-shaper circuit. The device also includes a buffer circuit configured to convert the first divided voltage signal to a second output voltage signal.

Example 14

The device of examples 1-13 or any combination thereof, wherein the amplifier circuit is configured to generate the output voltage signal by at least subtracting the feedback signal from the reference voltage signal to generate an error signal and amplifying the error signal. The feedback circuit is configured to generate the voltage step across the soft-shaper circuit such that the error signal is equal to zero at a time of the voltage step across the soft-shaper circuit.

Example 15

The device of examples 1-14 or any combination thereof, wherein the feedback circuit is configured to ramp the voltage level across the soft-shaper circuit to zero by at least ramping a voltage level of the feedback signal to a voltage level of the reference voltage signal.

Example 16

A method includes sensing a voltage step in a reference voltage signal received at a first input of an amplifier circuit. The method also includes generating a voltage step across a soft-shaper circuit approximately equal to the voltage step in the reference voltage signal in response to sensing the voltage step in the reference voltage signal. The method further includes delivering a feedback signal from the soft-shaper circuit to the amplifier circuit, wherein the feedback signal includes the voltage step across the soft-shaper circuit. The method includes ramping, after generating the voltage step across the soft-shaper circuit, a voltage level across the soft-shaper circuit to zero.

Example 17

The method of example 16, wherein ramping the voltage level across the soft-shaper circuit includes causing the voltage level across the soft-shaper circuit to linearly return to zero.

Example 18

The method of examples 16-17 or any combination thereof, wherein generating the voltage step across the soft-shaper circuit includes causing a variable current source to deliver an electrical current to a resistor to generate a voltage drop across the resistor approximately equal to the voltage step in the reference voltage signal in response to sensing the voltage step in the reference voltage signal. Ramping the voltage level across the soft-shaper circuit includes ramping the voltage drop across the resistor to zero after generating the voltage drop across the resistor approximately equal to the voltage step in the reference voltage signal.

Example 19

A voltage regulator circuit is configured to deliver a regulated signal to a light emitting diode (LED) based on an output voltage signal, and the voltage regulator circuit includes an amplifier circuit including a first input node and a second input node. The amplifier circuit is configured to receive a reference voltage signal at the first input node, receive a feedback signal at the second input node, and generate the output voltage signal based on the reference voltage signal and the feedback signal. The voltage regulator circuitry also includes a feedback circuit including a sense circuit configured to sense a voltage step in the reference voltage signal. The feedback circuit also includes a control circuit configured to cause the feedback circuit to generate a voltage step in the feedback signal approximately equal to the voltage step in the reference voltage signal in response to sensing the voltage step in the reference voltage signal. The control circuit is further configured to cause the feedback circuit to ramp a voltage level of the feedback signal to zero after generating the voltage step in the feedback signal and control whether the LED is active based on the output voltage signal.

Example 20

The voltage regulator circuit of example 19, further including a reference voltage circuit configured to generate the reference voltage signal and deliver the reference voltage signal to the amplifier circuit. The control circuit is further configured to receive a first enable signal, receive a second enable signal, and cause the reference voltage circuit to generate the voltage step in the reference voltage signal in response to receiving the first enable signal. The control circuit is configured to cause the feedback circuit to generate the voltage step in the feedback signal approximately equal to the voltage step in the reference voltage signal in response to receiving the second enable signal.

Example 21

The voltage regulator circuit of examples 19-20 or any combination thereof, wherein the feedback circuit includes a variable current source and a resistor. The control circuit is configured to cause the feedback circuit to generate the voltage step in the feedback signal by at least causing the variable current source to deliver an electrical current to the resistor to generate a voltage drop across the resistor approximately equal to the voltage step in the reference voltage signal. The control circuit is configured to cause the feedback circuit is configured to ramp the voltage level of the feedback signal by at least ramping the voltage drop across the resistor to zero after generating the voltage drop across the resistor approximately equal to the voltage step in the reference voltage signal.

Various examples of the disclosure have been described. Any combination of the described systems, operations, or functions is contemplated. These and other examples are within the scope of the following claims.

What is claimed is:

1. A device comprising:
an amplifier circuit including a first input and a second input, wherein the amplifier circuit is configured to:
   receive a reference voltage signal at the first input of the amplifier circuit;
   receive a feedback signal at the second input of the amplifier circuit; and
   generate an output signal based on the reference voltage signal and the feedback signal; and
a feedback circuit including a soft-shaper circuit that is electrically connected to the second input of the amplifier circuit, wherein the feedback circuit is configured to:
   sense a voltage step in the reference voltage signal;
   generate a voltage step across the soft-shaper circuit approximately equal to the voltage step in the reference voltage signal in response to sensing the voltage step in the reference voltage signal; and
   ramp a voltage level across the soft-shaper circuit to zero after generating the voltage step across the soft-shaper circuit.

2. The device of claim 1, wherein the feedback circuit is configured to ramp the voltage level across the soft-shaper circuit by at least causing the voltage level across the soft-shaper circuit to linearly return to zero.

3. The device of claim 1, further comprising a sample-and-hold circuit configured to:
   receive the reference voltage signal;
   deliver the reference voltage signal to the feedback circuit before delivering the reference voltage signal to the amplifier circuit; and
   deliver the reference voltage signal to the amplifier circuit concurrently with the voltage step across the soft-shaper circuit.

4. The device of claim 3, further comprising an analog-to-digital converter circuit configured to:
   convert the reference voltage signal to a digital signal; and
   deliver the digital signal to the feedback circuit,
   wherein the feedback circuit is configured to generate the voltage step across the soft-shaper circuit approximately equal to a voltage step that is encoded in the digital signal.

5. The device of claim 1,
wherein the soft-shaper circuit includes a variable current source and a resistor,
wherein the feedback circuit is configured to generate the voltage step across the soft-shaper circuit by at least causing the variable current source to deliver an electrical current to the resistor to generate a voltage drop across the resistor approximately equal to the voltage step in the reference voltage signal in response to sensing the voltage step in the reference voltage signal, and
wherein the feedback circuit is configured to ramp the voltage level across the soft-shaper circuit by at least ramping the voltage drop across the resistor to zero after generating the voltage drop across the resistor approximately equal to the voltage step in the reference voltage signal.

6. The device of claim 1, further comprising a voltage divider circuit configured to:
   receive the output voltage signal;

deliver a divided voltage signal to the soft-shaper circuit,
wherein the soft-shaper circuit is configured to deliver the feedback signal to the second input of the amplifier circuit by at least delivering the divided voltage signal to the second input of the amplifier circuit in steady state.

7. The device of claim 1, wherein the amplifier circuit is configured to generate the output voltage signal by at least generating an output electrical current based on the reference voltage signal and the feedback signal, the device further comprising:
a direct-current transformer configured to generate a secondary electrical current based on the output electrical current; and
a buffer circuit configured to generate a buffered voltage signal based on the secondary electrical current,
wherein the feedback circuit is configured to ramp the voltage level across the soft-shaper circuit to zero such that a voltage level of the feedback signal is equal to a voltage level of the buffered voltage signal after generating the voltage step across the soft-shaper circuit.

8. The device of claim 1, further comprising a light emitting diode (LED), wherein the amplifier circuit is configured to control whether the LED is active based on the output voltage signal.

9. The device of claim 8, further comprising a control circuit configured to:
receive a first enable signal;
cause a reference voltage circuit to generate the voltage step in the reference voltage signal in response to receiving the first enable signal;
receive a second enable signal;
cause, concurrently with causing the reference voltage circuit to generate the voltage step in the reference voltage signal, the feedback circuit to generate the voltage step across the soft-shaper circuit approximately equal to the voltage step in the reference voltage signal in response to receiving the second enable signal.

10. The device of claim 8, wherein the amplifier circuit is a first amplifier circuit, wherein the feedback circuit is a first feedback circuit, wherein the soft-shaper circuit is a second soft-shaper circuit, wherein the LED is a first LED, the device further comprising:
a second LED electrically connected in series with the first LED;
a second amplifier circuit including a first input and a second input, wherein the second amplifier circuit is configured to:
receive a second reference voltage signal at the first input of the second amplifier circuit;
receive a second feedback signal at the second input of the second amplifier circuit;
generate a second output signal based on the second reference voltage signal and the second feedback signal; and
control whether the second LED is active based on the second output signal;
a second feedback circuit including a second soft-shaper circuit that is electrically connected to the second input of the second amplifier circuit, wherein the second feedback circuit is configured to:
sense a voltage step in the second reference voltage signal;
generate a voltage step across the second soft-shaper circuit approximately equal to the voltage step in the second reference voltage signal in response to sensing the voltage step in the second reference voltage signal; and
ramp a voltage level across the second soft-shaper circuit after generating the voltage step across the second soft-shaper circuit; and
a control circuit configured to:
cause the first feedback circuit to generate the voltage step across the first soft-shaper circuit;
cause the second feedback circuit to generate the voltage step across the second soft-shaper circuit; and
cause the voltage step in the second reference voltage signal.

11. The device of claim 8, further comprising a control circuit configured to control whether the LED is dimmed by at least controlling the voltage level across the soft-shaper circuit.

12. The device of claim 8, further comprising a control circuit configured to deliver an enable signal to the feedback circuit,
wherein the feedback circuit is configured to generate the voltage step across the soft-shaper circuit in response to receiving sensing the voltage step in the reference voltage signal and in response to receiving the enable signal from the control circuit.

13. The device of claim 1, wherein the output voltage signal is a first output voltage signal, the device further comprising:
a voltage divider circuit configured to:
generate a first divided voltage signal; and
generate and deliver a second divided voltage signal to the soft-shaper circuit; and
a buffer circuit configured to convert the first divided voltage signal to a second output voltage signal.

14. The device of claim 1,
wherein the amplifier circuit is configured to generate the output voltage signal by at least:
subtracting the feedback signal from the reference voltage signal to generate an error signal; and
amplifying the error signal, and
wherein the feedback circuit is configured to generate the voltage step across the soft-shaper circuit such that the error signal is equal to zero at a time of the voltage step across the soft-shaper circuit.

15. The device of claim 1, wherein the feedback circuit is configured to ramp the voltage level across the soft-shaper circuit to zero by at least ramping a voltage level of the feedback signal to a voltage level of the reference voltage signal.

16. A method comprising:
sensing a voltage step in a reference voltage signal received at a first input of an amplifier circuit;
generating a voltage step across a soft-shaper circuit approximately equal to the voltage step in the reference voltage signal in response to sensing the voltage step in the reference voltage signal;
delivering a feedback signal from the soft-shaper circuit to the amplifier circuit, wherein the feedback signal includes the voltage step across the soft-shaper circuit; and
ramping, after generating the voltage step across the soft-shaper circuit, a voltage level across the soft-shaper circuit to zero.

17. The method of claim 16, wherein ramping the voltage level across the soft-shaper circuit comprises causing the voltage level across the soft-shaper circuit to linearly return to zero.

18. A voltage regulator circuit configured to deliver a regulated signal to a light emitting diode (LED) based on an output voltage signal, the voltage regulator circuit comprising:
- an amplifier circuit including a first input node and a second input node, wherein the amplifier circuit is configured to:
  - receive a reference voltage signal at the first input node;
  - receive a feedback signal at the second input node; and
  - generate the output voltage signal based on the reference voltage signal and the feedback signal; and
- a feedback circuit including:
  - a sense circuit configured to sense a voltage step in the reference voltage signal; and
  - a control circuit configured to:
    - cause the feedback circuit to generate a voltage step in the feedback signal approximately equal to the voltage step in the reference voltage signal in response to sensing the voltage step in the reference voltage signal;
    - cause the feedback circuit to ramp a voltage level of the feedback signal to zero after generating the voltage step in the feedback signal; and
    - control whether the LED is active based on the output voltage signal.

19. The voltage regulator circuit of claim 18, further comprising a reference voltage circuit configured to generate the reference voltage signal and deliver the reference voltage signal to the amplifier circuit, wherein the control circuit is further configured to:
- receive a first enable signal;
- receive a second enable signal; and
- cause the reference voltage circuit to generate the voltage step in the reference voltage signal in response to receiving the first enable signal, and
- wherein the control circuit is configured to cause the feedback circuit to generate the voltage step in the feedback signal approximately equal to the voltage step in the reference voltage signal in response to receiving the second enable signal.

20. The voltage regulator circuit of claim 18,
wherein the feedback circuit includes a variable current source and a resistor,
wherein the control circuit is configured to cause the feedback circuit to generate the voltage step in the feedback signal by at least causing the variable current source to deliver an electrical current to the resistor to generate a voltage drop across the resistor approximately equal to the voltage step in the reference voltage signal, and
wherein the control circuit is configured to cause the feedback circuit is configured to ramp the voltage level of the feedback signal by at least ramping the voltage drop across the resistor to zero after generating the voltage drop across the resistor approximately equal to the voltage step in the reference voltage signal.

* * * * *